US012573213B2

(12) United States Patent
Itsukaichi

(10) Patent No.: US 12,573,213 B2
(45) Date of Patent: Mar. 10, 2026

(54) IMAGE PROCESSING DEVICE, IMAGE PROCESSING METHOD, AND RECORDING MEDIUM

(71) Applicant: NEC Corporation, Tokyo (JP)

(72) Inventor: Hiroki Itsukaichi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 42 days.

(21) Appl. No.: 18/270,034

(22) PCT Filed: Jan. 4, 2021

(86) PCT No.: PCT/JP2021/000031
§ 371 (c)(1),
(2) Date: Jun. 28, 2023

(87) PCT Pub. No.: WO2022/145054
PCT Pub. Date: Jul. 7, 2022

(65) Prior Publication Data
US 2024/0071104 A1 Feb. 29, 2024

(51) Int. Cl.
*G06V 20/56* (2022.01)
*G06T 3/40* (2024.01)
(Continued)

(52) U.S. Cl.
CPC .............. *G06V 20/588* (2022.01); *G06T 3/40* (2013.01); *G06T 7/536* (2017.01); *G06V 10/25* (2022.01);
(Continued)

(58) Field of Classification Search
CPC .. G06V 20/588; G06V 10/25; G06V 2201/07; G06V 20/56; G06V 20/58;
(Continued)

(56) References Cited

U.S. PATENT DOCUMENTS

| | | | |
|---|---|---|---|
| 8,212,890 B2 * | 7/2012 | Nomura | H04N 23/88 |
| | | | 348/222.1 |
| 2004/0189831 A1 | 9/2004 | Shibatani et al. | |

(Continued)

FOREIGN PATENT DOCUMENTS

| | | | |
|---|---|---|---|
| JP | 2004194169 A | * | 7/2004 |
| JP | 2013-142972 A | | 7/2013 |

(Continued)

OTHER PUBLICATIONS

International Search Report for PCT Application No. PCT/JP2021/000031, mailed on Mar. 16, 2021.
(Continued)

*Primary Examiner* — Richard A Hansell, Jr.

(57) ABSTRACT

An image processing device includes an image acquiring unit, a first processing unit, a second processing unit and an outputting unit. The image acquiring unit is configured to acquire an image captured by an imaging device. The first processing unit is configured to perform first image processing on the image; a distant specifying means for specifying a distant portion of the image The second processing unit is configured to perform, on the distant portion of the image, second image processing differing from the first image processing The outputting unit is configured to provide output that is based on a processing result of the first image processing and a processing result of the second image processing.

10 Claims, 25 Drawing Sheets

(51) Int. Cl.
  *G06T 7/536*          (2017.01)
  *G06V 10/25*          (2022.01)
(52) U.S. Cl.
  CPC .......................... *G06T 2207/30252* (2013.01);
                *G06V 2201/07* (2022.01)
(58) Field of Classification Search
  CPC . G06T 3/40; G06T 7/536; G06T 2207/30252;
        G06T 7/73; G08G 1/166; G08G 1/09623;
        H04N 7/183; B60R 2300/307; B60R
                2300/605; B60R 1/00
  See application file for complete search history.

(56)              References Cited

U.S. PATENT DOCUMENTS

| | | | | |
|---|---|---|---|---|
| 2009/0060273 | A1* | 3/2009 | Stephan | G06V 20/58 |
| | | | | 382/103 |
| 2014/0064590 | A1* | 3/2014 | Imamura | A61B 6/00 |
| | | | | 382/298 |
| 2014/0118552 | A1 | 5/2014 | Takahama et al. | |
| 2015/0227800 | A1* | 8/2015 | Takemae | G06V 20/588 |
| | | | | 382/104 |
| 2015/0269445 | A1 | 9/2015 | Ueda et al. | |
| 2016/0358338 | A1* | 12/2016 | Tsunoda | G06V 10/462 |
| 2017/0316575 | A1* | 11/2017 | Adachi | G06T 5/50 |
| 2018/0150725 | A1* | 5/2018 | Tate | G06N 3/0464 |
| 2021/0112179 | A1* | 4/2021 | Omori | G06T 3/40 |
| 2021/0289116 | A1* | 9/2021 | Miyata | H04N 23/80 |
| 2022/0375341 | A1* | 11/2022 | Wang | G06T 7/70 |
| 2023/0234503 | A1 | 7/2023 | Eki | |

FOREIGN PATENT DOCUMENTS

| | | | | |
|---|---|---|---|---|
| JP | 2015-149028 | A | | 8/2015 |
| JP | 2015-179368 | A | | 10/2015 |
| JP | 2018-129833 | A | | 8/2018 |
| JP | 2019-014407 | A | | 1/2019 |
| JP | 2020044681 | A | * | 3/2020 |
| WO | 2012/172713 | A1 | | 12/2012 |
| WO | 2020/027233 | A1 | | 2/2020 |
| WO | WO-2021159310 | A1 | * | 8/2021 .......... G06V 20/625 |

OTHER PUBLICATIONS

English translation of Written opinion for PCT Application No. PCT/JP2021/000031, mailed on Mar. 16, 2021.

Samuel Schulter et al., "Learning to Look around Objects for Top-View Representations of Outdoor Scenes", ECCV, 2018, pp. 787-802.

Extended European Search Report for EP Application No. 21914916.8, dated on Jan. 5, 2024.

* cited by examiner

| SUBJECT TYPE ID | SUBJECT TYPE |
|---|---|
| 1 | PERSON |
| 2 | AUTOMOBILE |
| 3 | BUILDING |
| 4 | OTHER |
| 5 | ROAD |
| 6 | SKY |

| SUBJECT TYPE ID | SUBJECT TYPE |
|---|---|
| 1 | PERSON |
| 2 | AUTOMOBILE |
| 3 | BUILDING |
| 4 | OTHER |
| 5 | ROAD |
| 6 | SKY |

Fig.13

| SUBJECT TYPE ID | SUBJECT TYPE |
|:---:|:---:|
| 1 | PERSON |
| 2 | AUTOMOBILE |
| 3 | BUILDING |
| 4 | OTHER |
| 5 | ROAD |
| 6 | SKY |

Fig. 14

| SUBJECT TYPE ID | SUBJECT TYPE |
|---|---|
| 1 | PERSON |
| 2 | AUTOMOBILE |
| 3 | BUILDING |
| 4 | OTHER |
| 5 | ROAD |
| 6 | SKY |

Fig.16

| SCENE TYPE | TRUE/FALSE VALUE |
|---|---|
| THERE IS CROSSWALK AHEAD | TRUE |
| THERE IS PEDESTRIAN AHEAD | TRUE |
| THERE IS OBSTACLE AHEAD | FALSE |
| THERE IS SIDE ROAD ON LEFT SIDE | TRUE |
|  |  |

Fig.17

| SCENE TYPE | NUMERICAL VALUE |
|---|---|
| DISTANCE TO INTERSECTION AHEAD | 30 METERS |
| NUMBER OF LANES IN TRAVELING DIRECTION | 2 |
|  |  |

IMAGE PROCESSING DEVICE, IMAGE PROCESSING METHOD, AND RECORDING MEDIUM

This application is a National Stage Entry of PCT/JP2021/000031 filed on Jan. 4, 2021, the contents of all of which are incorporated herein by reference, in their entirety.

TECHNICAL FIELD

The present invention relates to an image processing device, an image processing method, and a recording medium.

BACKGROUND ART

An image processing technique using a computer is widely used. As an example of application of image processing, an approach useful for providing various services has been made by performing image processing on an image captured by a camera mounted on a vehicle. For example, PTL 1 discloses an image processing device that presents information that is easy for a driver to recognize by enlarging a region of interest, which is an object that the driver is interested in, in an image captured by a rear side camera mounted on a vehicle and displaying the region of interest in a synthesized manner.

Here, the image processing includes image recognition for recognizing contents shown in the image. As one type of such image recognition, there is region recognition (also referred to as region division or segmentation). The region recognition is a technique of estimating a subject type represented in each region included in the image used as an input. NPL 1 is an example disclosing such region recognition.

CITATION LIST

Patent Literature

PTL 1: JP 2018-129833 A

Non Patent Literature

NPL 1: S. Schulter et al., "Learning to Look around Objects for Top-View Representations of Outdoor Scenes", ECCV, 2018, pp. 815-831

Technical Problem

The inventor of the present invention has found that the image processing has the following problem. In a captured image, a distant subject occupies a small portion of the image. In many cases, such a small portion cannot be easily recognized by image processing. That is, there is a problem that it is difficult to accurately recognize a distant subject when image processing is performed on a captured image.

Here, the image processing device disclosed in PTL 1 merely displays a region of interest, which is an object that the driver is interested in, in such a way that the driver can easily recognize the region of interest. That is, the above-mentioned problem is not solved to accurately recognize a distant subject.

To solve the abovementioned problem, an object of the present invention is to provide an image processing device, an image processing method, and a recording medium capable of accurately recognizing a distant subject at the time of performing image processing on a captured image.

Solution to Problem

An image processing device according to an aspect of the present disclosure includes an image acquisition means configured to acquire an image captured by an imaging device, a first processing means configured to perform first image processing on the image, a distant portion specifying means configured to specify a distant portion of the image, a second processing means configured to perform second image processing on the distant portion of the image, the second image processing being different from the first image processing, and an output means configured to provide output based on a processing result of the first image processing and a processing result of the second image processing.

An image processing method performed by an image processing device according to an aspect of the present disclosure includes acquiring an image captured by an imaging device, performing first image processing on the image, specifying a distant portion of the image, performing second image processing on the distant portion of the image, the second image processing being different from the first image processing, and providing output based on a processing result of the first image processing and a processing result of the second image processing.

A recording medium storing a program according to an aspect of the present disclosure causes a computer to execute acquiring an image captured by an imaging device, performing first image processing on the image, specifying a distant portion of the image, performing second image processing on the distant portion of the image, the second image processing being different from the first image processing, and providing output based on a processing result of the first image processing and a processing result of the second image processing.

Advantageous Effects of Invention

According to the present disclosure, it is possible to accurately recognize a distant subject at the time of performing image processing on a captured image.

BRIEF DESCRIPTION OF DRAWINGS

FIG. 13 is a diagram illustrating an example of a processing result of the second image processing according to the first example embodiment.

FIG. 14 is a diagram illustrating an example of how to reduce the processing result according to the first example embodiment.

FIG. 16 is a diagram illustrating an example of a scene recognition result according to the first example embodiment.

FIG. 17 is a diagram illustrating another example of a scene recognition result according to the first example embodiment.

EXAMPLE EMBODIMENT

Figure 1:
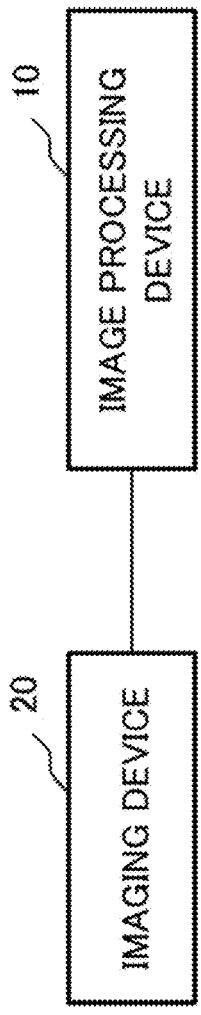
FIG. 1 is a diagram illustrating an example of a configuration of an image processing system according to a first example embodiment.

Example embodiments of the present invention will be described in detail with reference to the drawings. Note that, in the drawings and the example embodiments described in the specification, the same components will be denoted by the same reference signs, and the description thereof will be appropriately omitted.

First Example Embodiment

A first example embodiment will be described.
<Description of Configuration>
First, a configuration according to the first example embodiment will be described.

FIG. 1 is a diagram illustrating a configuration of an image processing system according to the first example embodiment. Referring to FIG. 1, the image processing system includes an image processing device 10 and an imaging device 20. The image processing device 10 and the imaging device 20 are communicably connected to each other.

The image processing device 10 acquires an image captured by the imaging device 20, performs image processing on the image, and performs output based on a processing result. The image processing device 10 is implemented as, for example, a computer mounted on a vehicle. However, the image processing device 10 is not limited thereto, and may be implemented as, for example, a server installed in a data center or the like.

The imaging device 20 captures an image. The imaging device 20 is, for example, a camera of a drive recorder mounted on the vehicle. In this case, the imaging device 20 generates an image around the vehicle, for example, by capturing an image in a forward direction. However, the imaging device 20 is not limited thereto, and may be, for example, a camera installed on a road side of a road or a camera installed inside a facility. In addition, the image captured by the imaging device 20 may be a still image or an image having a plurality of temporally consecutive frames (a moving image).

The image processing device 10 and the imaging device 20 may be connected to each other by wired communication such as wired LAN or internal bus communication, or may be connected to each other by wireless communication such as wireless LAN or near field communication. For example, in a case where the image processing device 10 and the imaging device 20 are mounted on the same vehicle, the image processing device 10 and the imaging device 20 may be connected to each other by an internal bus of the vehicle, but the connection between the image processing device 10 and the imaging device 20 is not limited thereto.

In addition, one image processing system may include a plurality of image processing devices 10 and a plurality of imaging devices 20. In this case, the image processing devices 10 and the imaging devices 20 do not necessarily need to be connected to each other on a one-to-one basis, and may be connected to each other on a one-to-many basis or on a many-to-many basis. For example, a plurality of imaging devices 20 may be connected to one image processing device 10.

Figure 2:
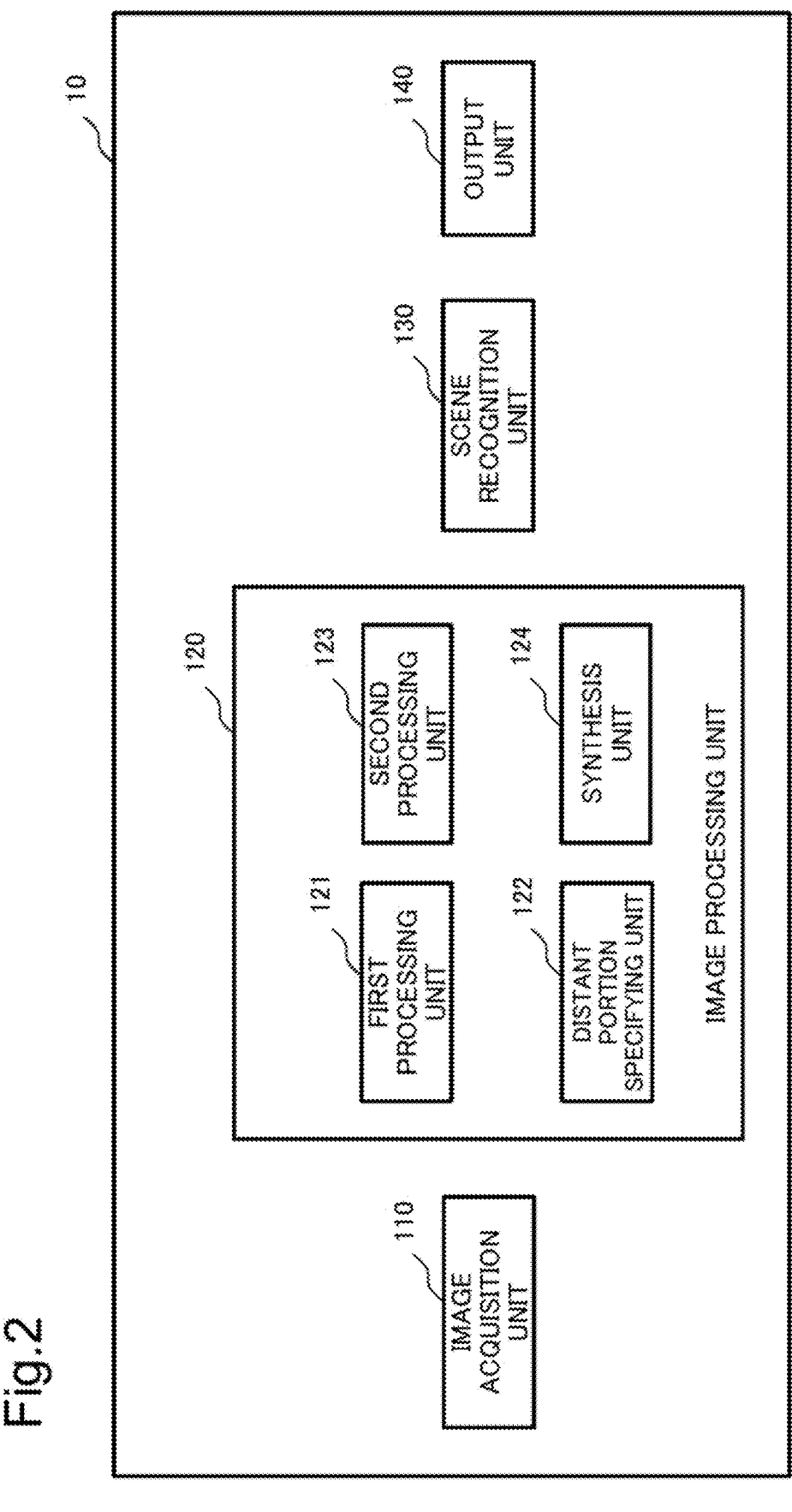
FIG. 2 is a diagram illustrating examples of functional blocks of the image processing device 10 according to the first example embodiment.

FIG. 2 is a diagram illustrating functional blocks of the image processing device 10 according to the first example embodiment. Referring to FIG. 2, the image processing device 10 includes an image acquisition unit 110, an image processing unit 120, a scene recognition unit 130, and an output unit 140.

The image acquisition unit 110 functions as a means for acquiring an image captured by the imaging device 20.

The image processing unit 120 functions as a means for performing image processing on the acquired image and generating a processing result. Furthermore, the image processing unit 120 includes a first processing unit 121, a distant portion specifying unit 122, a second processing unit 123, and a synthesis unit 124.

The first processing unit 121 functions as a means for performing predetermined first image processing on the acquired image.

The range of the image to be subjected to the first image processing by the first processing unit 121 is, for example, the entire image. However, the first processing unit 121 is not limited thereto, and may exclude a partial range of the image (e.g., a distant portion of the image) from what is to be subjected to the first image processing by using mask processing or the like.

As the first image processing performed by the first processing unit 121, various methods can be used. For example, the first processing unit 121 can perform region recognition as the first image processing. In the first example embodiment, a case where region recognition is performed as the first image processing will be mainly described as an example.

The first processing unit 121 generates a first processing result as a result of performing the first image processing.

The distant portion specifying unit 122 functions as a means for specifying a distant portion from the acquired image.

Here, the distant portion is a portion of the image that includes a distant subject. The distant portion is represented by, for example, a rectangle including the distant subject in the image. However, the distant portion is not limited thereto, and may be represented by a polygon other than the rectangle, a circle, an ellipse, or another shape. In addition, the distant portion is not limited to such a single continuous shape in the image, and may have a plurality of discrete shapes.

As a result of specifying the distant portion, the distant portion specifying unit 122 generates distant portion specifying information expressing the distant portion in a predetermined format. In a case where the distant portion represented by a rectangle, the distant portion specifying information refers to, for example, coordinates of the rectangle as each point in the image.

The second processing unit 123 functions as a means for performing second image processing different from the first image processing on the distant portion of the image acquired based on the distant portion specifying information.

As the second image processing performed by the second processing unit 123, various methods can be used. For example, as the second image processing, the second processing unit 123 can use processing for enlarging the distant portion of the image, performing predetermined processing on the enlarged image, and reducing a result of the predetermined processing. Alternatively, the second processing unit 123 can use, for example, image processing to which a setting different from that for the first image processing is applied, as the second image processing, on the distant portion of the image.

As a result of performing the predetermined second image processing as described above, the second processing unit 123 generates a second processing result.

The synthesis unit 124 functions as a means for synthesizing the first processing result and the second processing result. The synthesis unit 124 generates a synthesis processing result that is a result of the synthesis.

The scene recognition unit 130 functions as a means for performing scene recognition based on at least one of the first and second processing results and the synthesis processing result. Here, the scene recognition is processing for recognizing a meaning of a scene shown in the image. The scene recognition unit 130 generates a scene recognition result as a result of the scene recognition.

The output unit 140 functions as a means for performing predetermined output based on at least one of the first and second processing results, the synthesis processing result, and the scene recognition result.

<Description of Operation>

Next, an operation according to the first example embodiment will be described.

Figure 3:
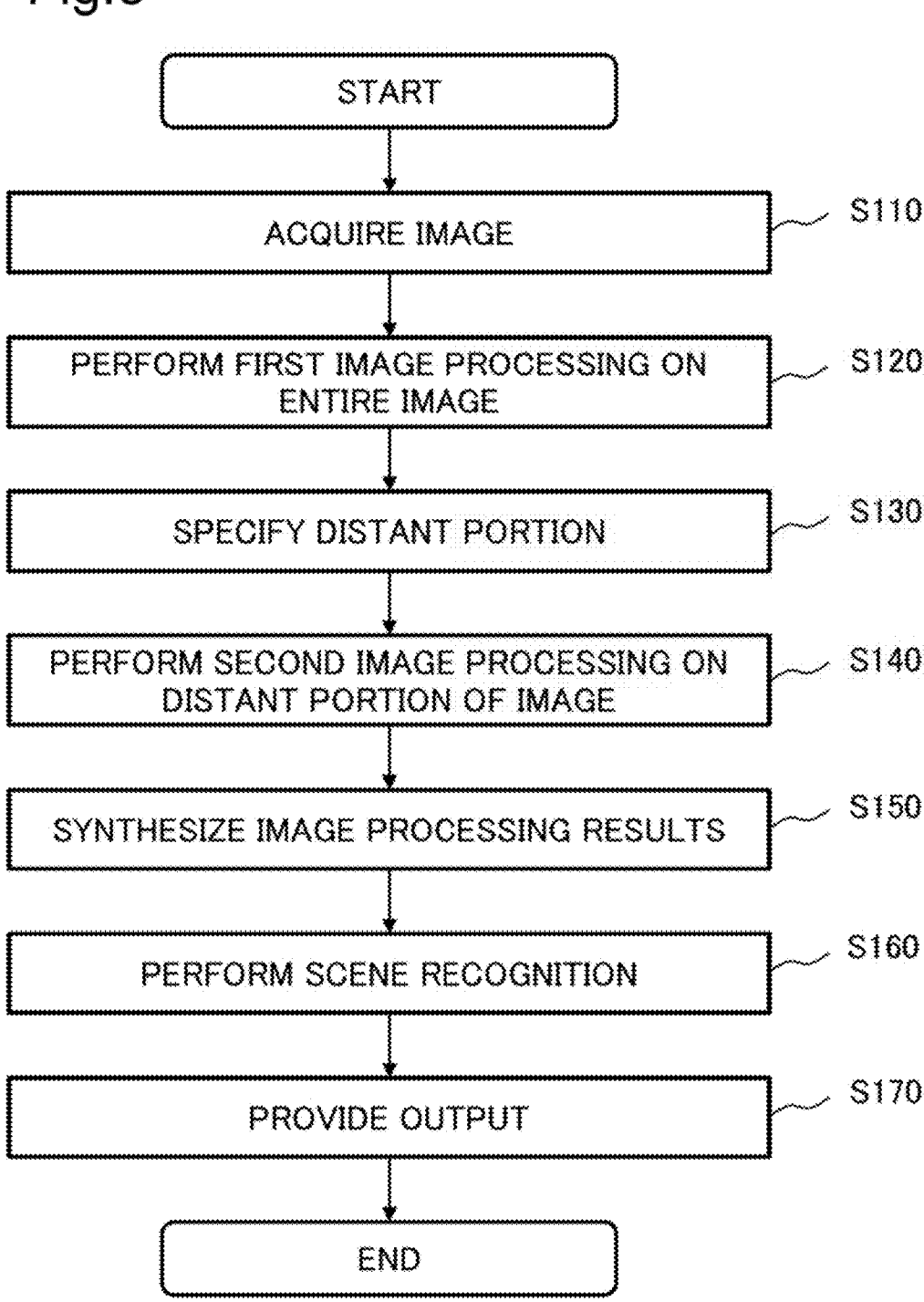
FIG. 3 is a flowchart illustrating an example of an operation of the image processing device 10 according to the first example embodiment.

FIG. 3 is a flowchart illustrating an operation of the image processing device 10 according to the first example embodiment.

Figure 4:
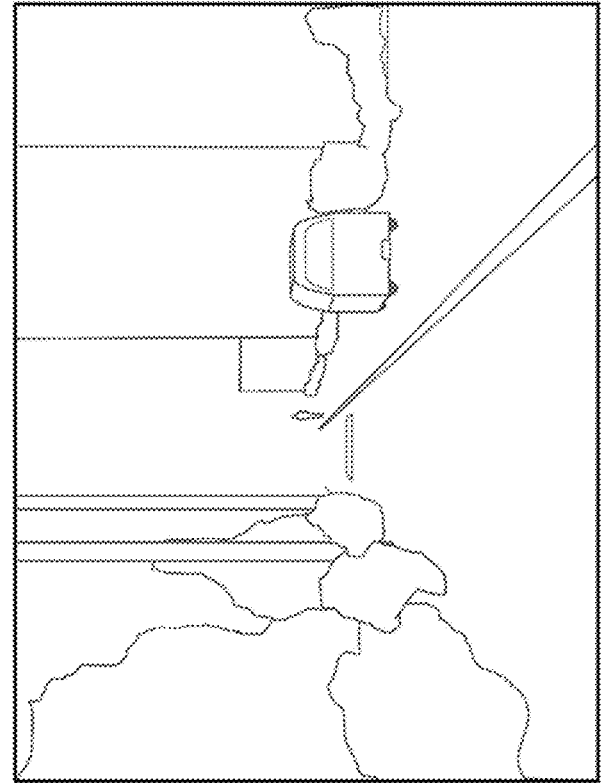
FIG. 4 is a diagram illustrating an example of an acquired image according to the first example embodiment.

The image acquisition unit 110 of the image processing device 10 acquires a captured image from the imaging device 20 (step S110 in FIG. 3). For example, the image acquisition unit 110 acquires an image including a road in front of the vehicle as illustrated in FIG. 4.

The first processing unit of the image processing device 10 performs predetermined first image processing on the image acquired by the image acquisition unit 110 and generates a first processing result (step S120 in FIG. 3).

As the first image processing performed by the first processing unit 121, various methods can be used. For example, the first processing unit 121 can perform region recognition as the first image processing. In the first example embodiment, a case where region recognition is performed as the first image processing will be mainly described Using the acquired image as an input image, the first processing unit 121 performs region recognition (also referred to as region division or segmentation) on the input image, estimates a subject type shown in each region included in the input image, and generates a processing result.

Figure 5:
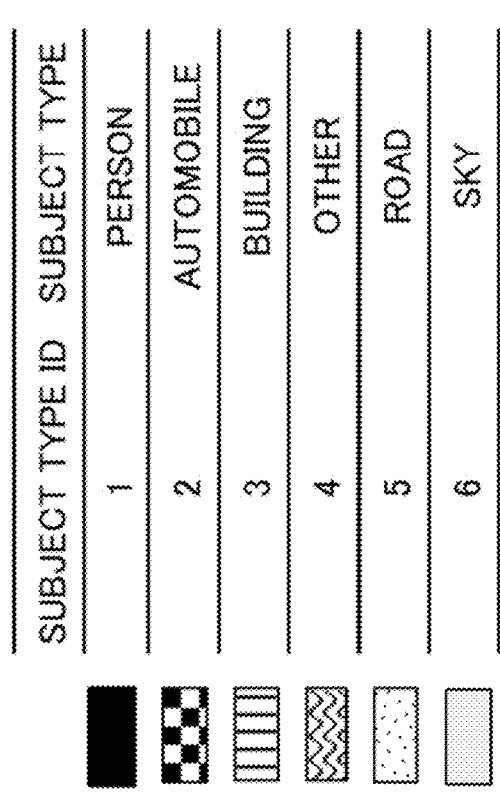
FIG. 5 is a diagram illustrating an example of a region recognition processing result according to the first example embodiment.
Figure 5:
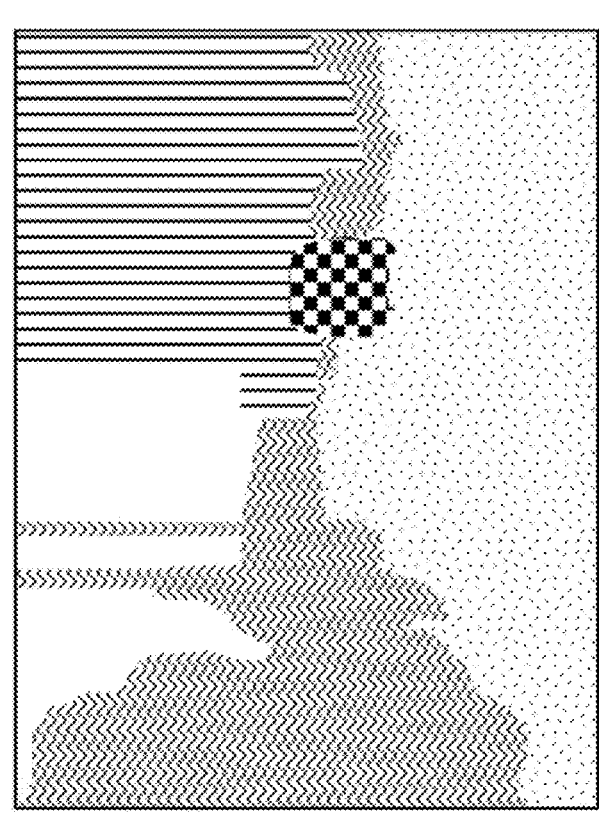

FIG. 5 is a diagram illustrating an example of a region recognition processing result. Referring to FIG. 5, the region recognition processing result is expressed, for example, by an image having the same resolution as the input image in an image format in which a subject type ID to which a pixel of the input image corresponding to each pixel belongs is stored in each pixel. Here, the subject type ID is an identifier for identifying the subject type. In the example of FIG. 5, subject type IDs are numerical values of 1, 2, 3, 4, 5, and 6, which correspond to a person, an automobile, a building, others, a road, and the sky, respectively, as types of subjects.

The types of the subjects are not limited to the example of FIG. 5, and may include, for example, a two-wheeled vehicle, a sign, a traffic light, a white line, a stop line, an obstacle, a crosswalk, a parking lot (a parking space on a shoulder), a paint on a road, a sidewalk, a driveway (a vehicle passage on a sidewalk connecting a roadway and a facility to each other), a railroad, and vegetation.

Furthermore, in a case where region recognition is performed as the first image processing, the first processing unit 121 may calculate a degree of reliability when the subject type shown in each region is estimated, and include the degree of reliability in the processing result. For example, in the example of FIG. 5, a degree of reliability for each pixel may be separately generated as additional information and included in the processing result.

The first processing unit 121 executes the first image processing as described above to generate a first processing result.

Next, the distant portion specifying unit 122 of the image processing device 10 specifies a distant portion based on the image acquired by the image acquisition unit 110, and generates distant portion specifying information (step S130 in FIG. 3).

As a method by which the distant portion specifying unit 122 specifies the distant portion, various methods can be used. Specific examples will be described below.

First Example of how to Specify Distant Portion

Figure 6:
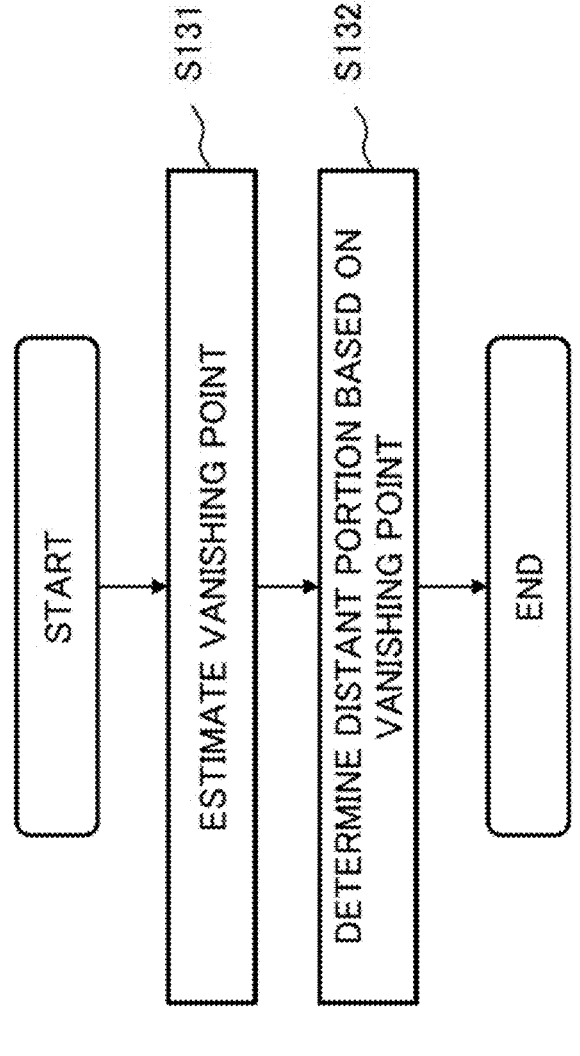
FIG. 6 is a flowchart illustrating an example of an operation of a distant portion specifying unit 122 according to the first example embodiment.

A first example of how to specify a distant portion will be described. FIG. 6 is a flowchart illustrating an operation of the distant portion specifying unit 122. In the first example of how to specify the distant portion, the image acquired by the image acquisition unit 110 is an image including a road.

Figure 7:
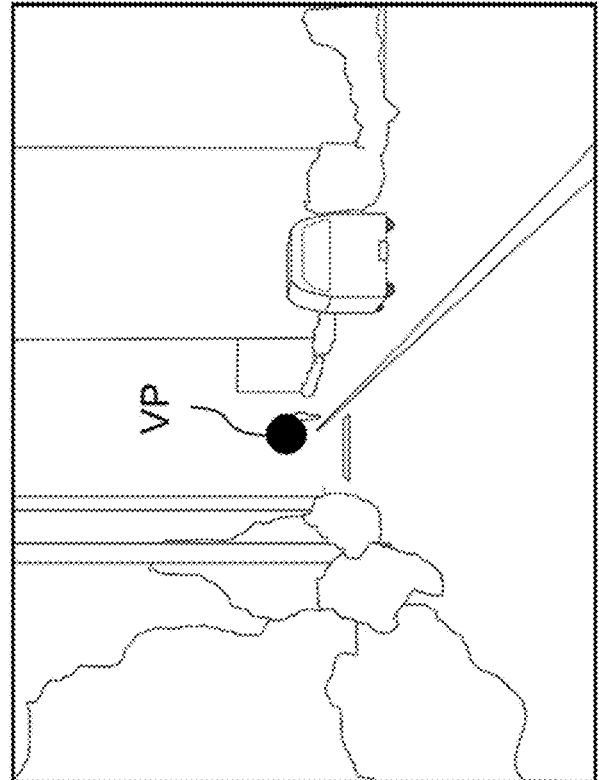
FIG. 7 is a diagram illustrating an example of a vanishing point of a road according to the first example embodiment.

The distant portion specifying unit 122 estimates a vanishing point of a road in the image acquired by the image acquisition unit 110 (step S131 in FIG. 6). Here, the vanishing point of the road will be described. In an image including a road, it is usual that the road is displayed smaller as the road is more distant, and the road is aggregated into one point when the road is much more distant. The vanishing point of the road is such a point at which the distant road is aggregated in the image. FIG. 7 is a diagram illustrating an example of such a vanishing point of a road in an image including the road. In FIG. 7, a point VP represents the vanishing point of the road.

As a method by which the distant portion specifying unit 122 estimates the vanishing point of the road, various methods can be used. Specific examples will be described below.

First Example of how to Estimate Vanishing Point

A first example of how to estimate a vanishing point will be described.

Figure 8:
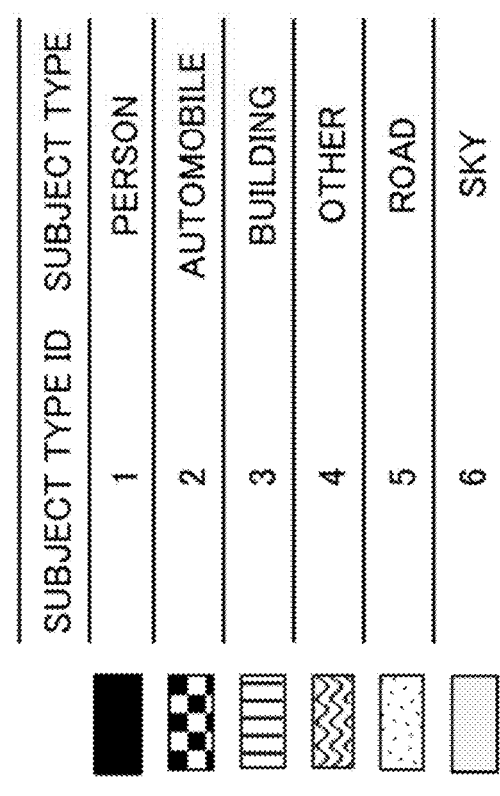
FIG. 8 is a diagram illustrating an example of how to estimate a vanishing point of a road according to the first example embodiment.
Figure 8:
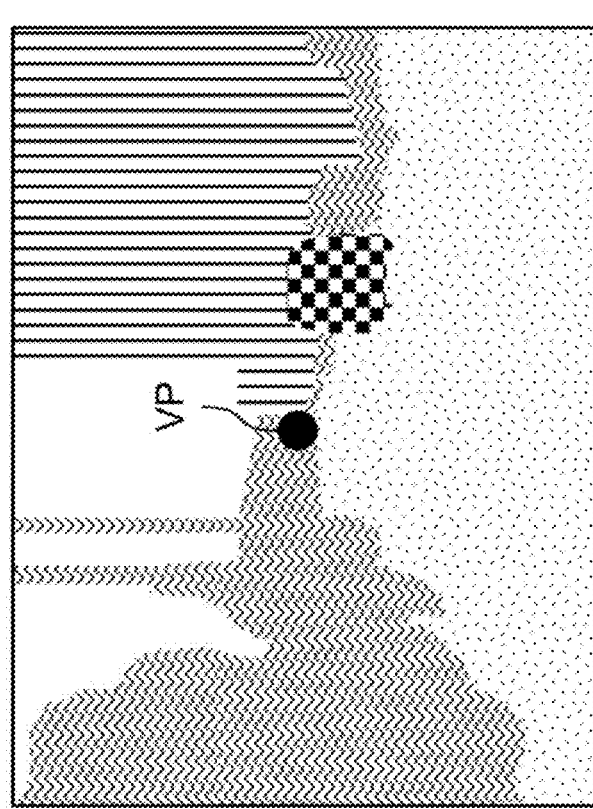

First, the distant portion specifying unit 122 performs region recognition on the acquired image. Next, the distant portion specifying unit 122 extracts an uppermost point of the image from a region in which the subject type is estimated to be a road in a region recognition processing result, and estimates the extracted point as a vanishing point of the road. This is because the imaging device 20 usually captures an image of a road in such an arrangement that the more distant the road is, the higher the road is shown in the image. FIG. 8 is a diagram illustrating an example of a vanishing point of a road estimated in this manner. In FIG. 8, a point VP represents the estimated vanishing point of the road.

In the first example of how to estimate a vanishing point, simple region recognition may be used as region recognition performed by the distant portion specifying unit 122. As an example of simple region recognition, the distant portion specifying unit 122 may use region recognition in which types of subjects are limited to a small number (e.g., a road and two other things). In addition, as an example of simple region recognition, the distant portion specifying unit 122 may reduce an image and perform region recognition on the reduced image. By using such simple region recognition, it is possible to reduce the processing load in the distant portion specifying unit 122.

Furthermore, in the first example of how to estimate a vanishing point, if the first processing unit 121 has already performed region recognition as the first image processing, the distant portion specifying unit 122 may use a region recognition processing result generated by the first processing unit 121 without performing region recognition. By omitting the region recognition in this manner, it is possible to reduce the processing load in the distant portion specifying unit 122.

Second Example of how to Estimate Vanishing Point

A second example of how to estimate a vanishing point will be described.

Figure 9:
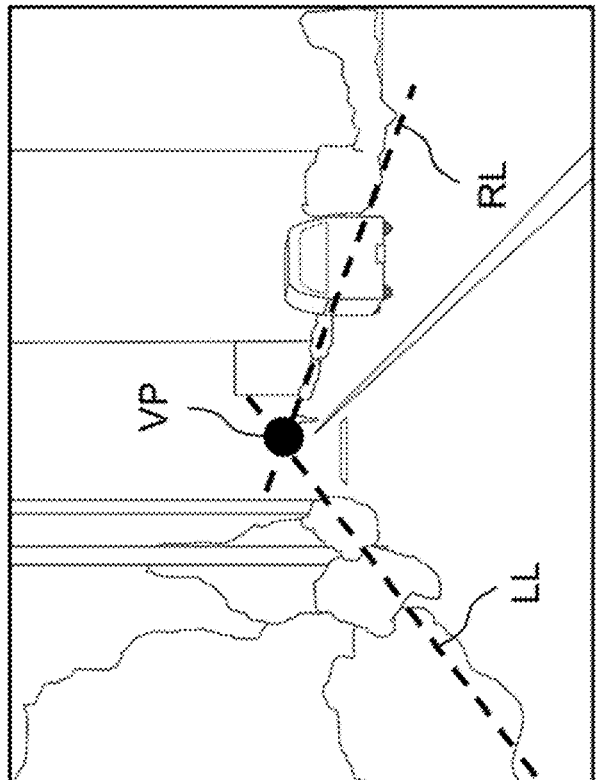
FIG. 9 is a diagram illustrating another example of how to estimate a vanishing point of a road according to the first example embodiment.

First, the distant portion specifying unit 122 estimates lines representing left and right road edges, respectively, on a road. Next, the distant portion specifying unit 122 estimates, as a vanishing point of the road, a location where the lines representing left and right road edges intersect. FIG. 9 is a diagram illustrating an example of such lines representing road edges and such a vanishing point of a road. In FIG. 9, a line LL represents the left road edge, a line RL represents the right road edge, and a point VP represents the vanishing point of the road.

In the second example of how to estimate a vanishing point, as a method by which the distant portion specifying unit 122 estimates lines representing road edges, various methods can be used. For example, the distant portion specifying unit 122 may perform region recognition on the acquired image, extract a region in which the subject type is estimated to be a road from a region recognition processing result, and approximate left and right edges of the extracted region with straight lines, the straight lines being used as lines representing road edges. In addition, for example, the distant portion specifying unit 122 may detect a white line and/or a guard rail from the acquired image, and approximate the detected white line and/or the detected guard rail with a straight line, the straight line being used as a line representing a road edge.

Note that the distant portion specifying unit 122 has been described as approximating a line representing a road edge with a straight line, but the distant portion specifying unit 122 is not limited thereto, and may approximate a line representing a road edge with a curved line. By using the approximation with the curved line, for example, in a case where the road is curved, the vanishing point of the road can be accurately estimated.

In addition, the distant portion specifying unit 122 may select which one is used for each image between approximation with a straight line and approximation with a curved line. In this case, for example, the distant portion specifying unit 122 may perform approximation with a straight line and approximation with a curve, and select one having a smaller approximation error. In addition, in a case where the image processing device 10 is capable of acquiring an image-captured position and road map information, the distant portion specifying unit 122 may estimate whether the road displayed in the image is a straight line or a curved line based on the image-captured position and the road map information, and select which one is used between approximation with a straight line and approximation with a curved line according to an estimation result. Furthermore, in a case where the imaging device 20 is mounted on a vehicle and the image processing device 10 is capable of acquiring travel data (e.g., acceleration in the left-right direction or a steering wheel angle) of the vehicle at the time of capturing an image, the distant portion specifying unit 122 may estimate whether a road displayed in the image is a straight line or a curved line based on the travel data, and select which one is used between approximation with a straight line and approximation with a curved line according to an estimation result. In this manner, by selects which one is used between approximation with a straight line and approximation with a curved line, the distant portion specifying unit 122 can accurately estimate a vanishing point of the road according to the shape of the road displayed in the image.

Next, the distant portion specifying unit 122 determines a distant portion based on the estimated vanishing point of the road (step S132 in FIG. 6).

As a method by which the distant portion specifying unit 122 determines the distant portion, various methods can be used. Specific examples will be described below.

First Example of how to Determine Distant Portion

A first example of how to determine a distant portion will be described.

Figure 10:
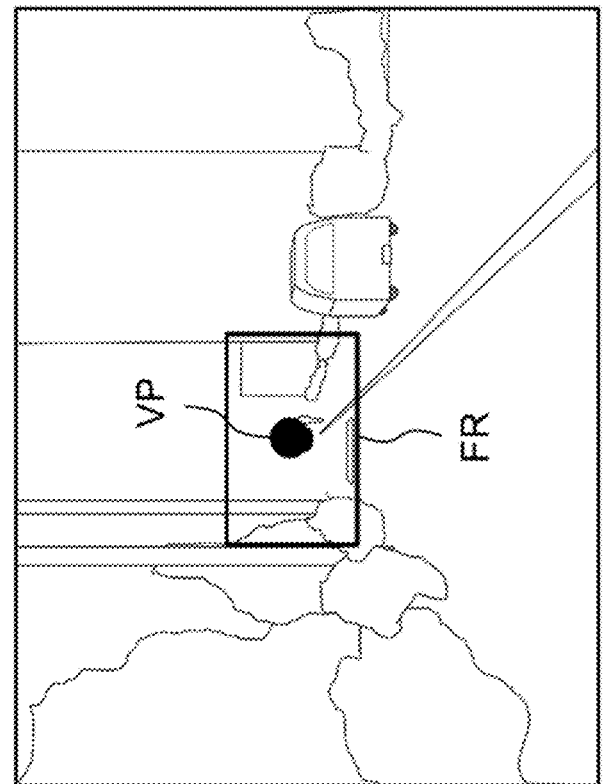
FIG. 10 is a diagram illustrating an example of a distant portion of an image according to the first example embodiment.

In the first example of how to determine a distant portion, the distant portion specifying unit 122 determines, as a distant portion, a portion occupying a predetermined proportion of the image with the estimated vanishing point as the center. FIG. 10 is a diagram illustrating the distant portion determined in this manner. In FIG. 10, a point VP represents the vanishing point of the road, and a portion FR represents the distant portion.

The shape of the distant portion is, for example, a rectangle having the same aspect ratio as the acquired image. However, the shape of the distant portion is not limited thereto, and may be a rectangle having an aspect ratio different from that of the acquired image, or may be a polygon other than the rectangle, a circle, an ellipse, or another shape. The predetermined ratio is, for example, $1/16$ of the area of the acquired image. However, the predetermined ratio is not limited thereto, and another ratio may be used.

Second Example of how to Determine Distant
Portion

A second example of how to determine a distant portion will be described.

First, the distant portion specifying unit 122 lists a plurality of portions including the estimated vanishing point of the road as candidates for the distant portion.

Figure 11:
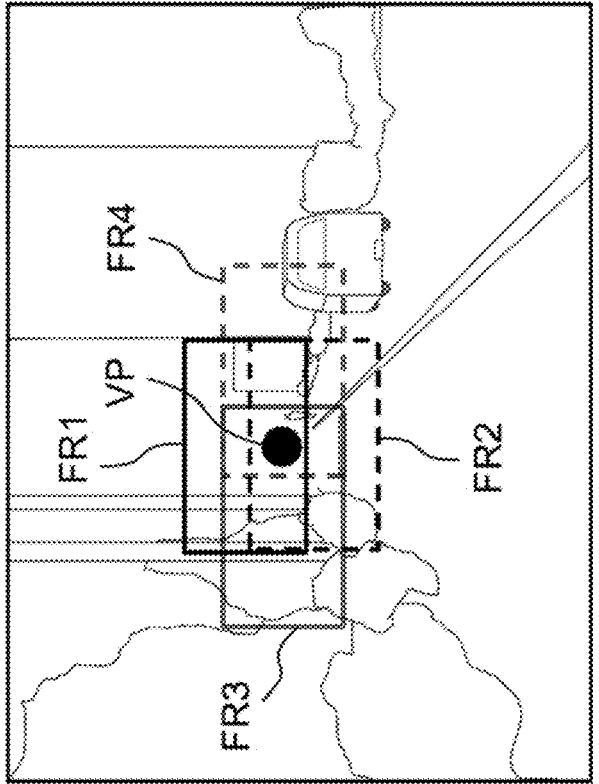
FIG. 11 is a diagram illustrating examples of candidates for the distant portion of the image according to the first example embodiment.

FIG. 11 is a diagram illustrating an example of the candidates for the distant portion listed by the distant portion specifying unit 122. In FIG. 11, a point VP indicates an estimated vanishing point of a road, a portion FR1 indicates a portion including the vanishing point of the road in its lower half, a portion FR2 indicates a portion including the vanishing point of the road in its upper half, a portion FR3 indicates a portion including the vanishing point of the road in its right half, and a portion FR4 indicates a portion including the vanishing point of the road in its left half. The distant portion specifying unit 122 can list such a plurality of rectangular portions as candidates for the distant portion. However, the distant portion specifying unit 122 is not limited thereto, and can list, as candidates for the distant portion, any number of portions each occupying any other position in any other shape and in any other size.

Next, the distant portion specifying unit 122 evaluates the plurality of candidates for the distant portion in accordance with a predetermined standard, and determines a highest-evaluated candidate as the distant portion.

For example, the distant portion specifying unit 122 can evaluate the plurality of candidates for the distant portion based on a region recognition processing result. As an example, among the candidates for the distant portion, the distant portion specifying unit 122 can highly evaluate one including a large number of regions each showing a subject type (e.g., a road) desired to be gazed. By evaluating the candidates for the distant portion in this manner, it is possible to determine a portion including a subject desired to be gazed in a large number of regions as the distant portion.

In a case where the evaluation is performed based on the region recognition processing result, the distant portion specifying unit 122 may use simple region recognition as the region recognition as described in the first example of how to estimate a vanishing point. Furthermore, in the first example of how to estimate a vanishing point, if the first processing unit 121 has already performed region recognition as the first image processing, the distant portion specifying unit 122 may use a region recognition processing result generated by the first processing unit 121 without performing region recognition. Furthermore, in the first example of how to estimate a vanishing point, if the distant portion specifying unit 122 has already performed region recognition, the distant portion specifying unit 122 may use a result of the region recognition processing that has already been performed without performing further region recognition. By omitting the region recognition in this manner, it is possible to reduce the processing load in the distant portion specifying unit 122.

Second Example of how to Specify Distant Portion

A second example of how to specify a distant portion will be described.

In the second example of how to specify a distant portion, the image acquisition unit 110 acquires an image (a moving image) having a plurality of temporally consecutive frames from the imaging device 20. The image (moving image) having the plurality of frames is an image including a road.

First, the distant portion specifying unit 122 performs the processing as described in the first example of how to specify a distant portion on each of the plurality of frames of the image (the moving image), and generates a plurality of temporally consecutive distant portions. Next, the distant portion specifying unit 122 integrates the plurality of temporally consecutive distant portions to set one distant portion.

The integration of the plurality of distant portions is performed, for example, by statistically processing the plurality of distant portions. Here, an example of statistical processing will be described. First, among the plurality of temporally consecutive distant portions, the distant portion specifying unit 122 excludes a distant portion extremely different in position or size from the others. Next, the distant portion specifying unit 122 calculates a representative position or size with respect to the remaining distant portions (for example, calculates an average of positions or sizes). A portion having the position or size calculated in this manner is set as a distant portion. However, the distant portion specifying unit 122 is not limited thereto, and may use another statistical processing as the integration of the distant portions.

The integration of the plurality of distant portions can be performed every predetermined time unit. For example, the distant portion specifying unit 122 may divide an image (a moving image) of a plurality of frames in a time unit of 5 seconds, and perform integration every time unit of 5 seconds. However, the distant portion specifying unit 122 is not limited thereto, and may perform integration every another fixed or variable time unit.

In this manner, by specifying a distant portion based on a plurality of images consecutively captured in time, the distant portion specifying unit 122 can accurately specify the distant portion of the road even when the region showing the road in the image is temporarily hidden by a vehicle, a person, an obstacle, or the like.

Third Example of how to Specify Distant Portion

A third example of how to specify a distant portion will be described.

In the third example of how to specify a distant portion, the distant portion specifying unit 122 specifies a predetermined range as the distant portion. For example, the distant portion specifying unit 122 can use a rectangular portion having a size of ¹⁄₁₆ of the area of the acquired image with its center coinciding with the center of the image as the predetermined range. However, the distant portion specifying unit 122 is not limited thereto, and may use a portion occupying any other position in any other shape and in any other size as the predetermined range.

The predetermined range can be set, for example, by a user or an administrator of the image processing device 10 or by a user or an administrator of the imaging device 20. After the imaging device 20 is installed, the user or the administrator may check an image captured by the imaging device 20 and set a range considered to represent a distant portion. As an example, in a case where the imaging device 20 is a camera of a drive recorder mounted on the vehicle, the user or the administrator may check an angle of view or the like from an image captured by the camera and set a range considered to represent a distant portion of a road. In a case where there is a plurality of imaging devices 20, the above-described predetermined range may be different for each imaging device 20.

Another Example of how to Specify Distant Portion

Another example of how to specify a distant portion will be described.

In each of the above-described examples of how to specify a distant portion, when a region showing a road is recognized using region recognition, the recognition may be performed using data interpolation (also referred to as image hallucination) together with the region recognition. For example, NPL 1 discloses a technique in which region recognition is performed on an image captured by a camera mounted on a vehicle to specify a region showing an object in a screen foreground such as a vehicle, and data interpolation is further performed to estimate a region showing a road hidden by the object in the screen foreground. The distant portion specifying unit 122 may recognize the region showing the road using the technique disclosed in NPL 1. In this manner, by using the data interpolation together with the region recognition, the distant portion specifying unit 122 can accurately specify the distant portion of the road even when the region showing the road in the image is temporarily hidden by a vehicle, a person, an obstacle, or the like.

Furthermore, in each of the above-described examples of how to specify a distant portion, in a case where the distant portion specifying unit 122 processes an image (a moving image) having a plurality of temporally consecutive frames, the distant portion specifying unit 122 may omit processing on some frames. For example, the distant portion specifying unit 122 may divide an image (a moving images) having a plurality of frames in a time unit of 5 seconds, and perform processing for specifying a distant portion only on one frame in the time unit of 5 seconds while omitting processing on the other frames. However, the distant portion specifying unit 122 is not limited thereto, and may omit processing on any number of frames every another fixed or variable time unit. In this case, when the processing on the frame is performed, the distant portion specifying unit 122 may temporarily store the specified distant portion. Then, when the processing on the frame is omitted, the distant portion specifying unit 122 may specify the temporarily stored distant portion (in the temporally previous frame) as the distant portion in the frame. By omitting processing on some frames in this manner, it is possible to reduce the processing load in the distant portion specifying unit 122.

After specifying the distant portion as described above, the distant portion specifying unit 122 generates distant portion specifying information expressing the distant portion in a predetermined format. As an example, in a case where the distant portion represented by a rectangle, the distant portion specifying information refers to, for example, coordinates of the rectangle as each point in the image. However, the distant portion specifying information is not limited thereto, and any format can be used as the distant portion specifying information according to the shape or the like of the distant portion.

Next, the second processing unit 123 of the image processing device 10 performs predetermined second image processing different from the first image processing on the distant portion of the image acquired by the image acquisition unit 110 based on the distant portion specifying information generated by the distant portion specifying unit 122, and generates a second processing result (step S140 in FIG. 3).

As the second image processing performed by the second processing unit 123, various methods can be used. Specific examples will be described below.

First Example of Second Image Processing

A first example of second image processing will be described.

Figure 12:
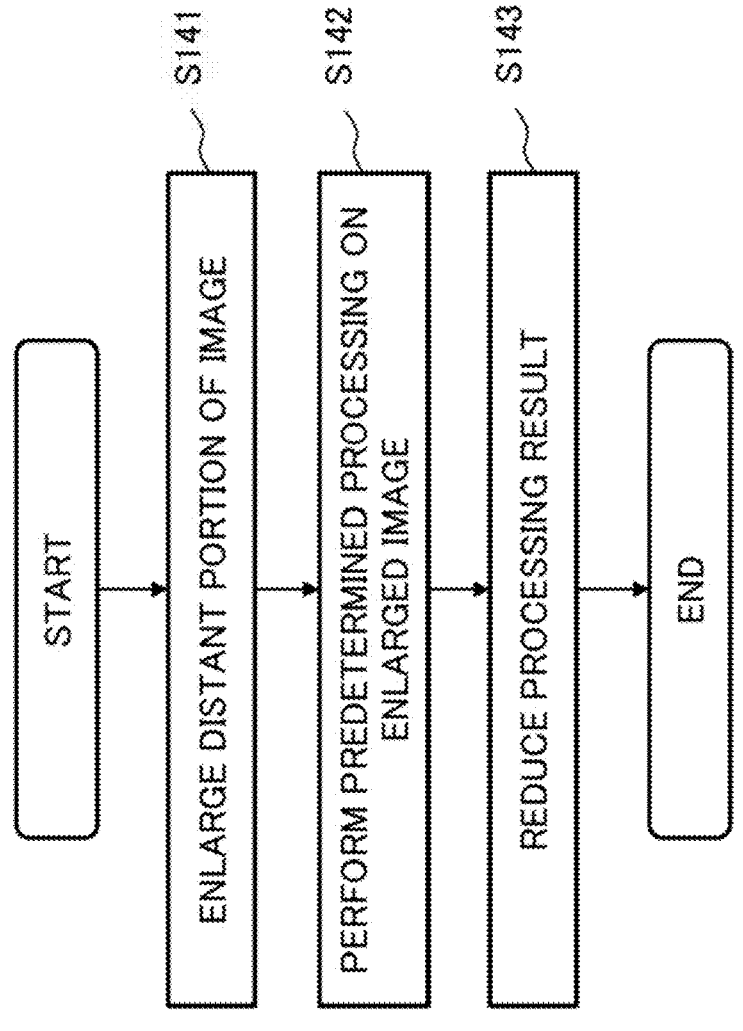
FIG. 12 is a diagram illustrating an example of second image processing according to the first example embodiment.

FIG. 12 is a diagram illustrating an operation in the first example of second image processing. In the first example of second image processing, the second processing unit 123 enlarges the distant portion of the image, performs predetermined processing on the enlarged image, and reduces a processing result of the predetermined processing.

First, the second processing unit 123 cuts out a distant portion of the image from the image acquired by the image acquisition unit 110 by using the distant portion specifying information generated by the distant portion specifying unit 122. Then, the second processing unit 123 enlarges the cut-out image to a predetermined size (step S141 in FIG. 12). Here, the predetermined size is, for example, the same size as the size of the acquired image. However, the predetermined size is not limited thereto, and may be any other size. In addition, the image enlargement can be performed using a nearest neighbor interpolation method, a bilinear interpolation method, a bicubic interpolation method, or another known method.

Figure 13:
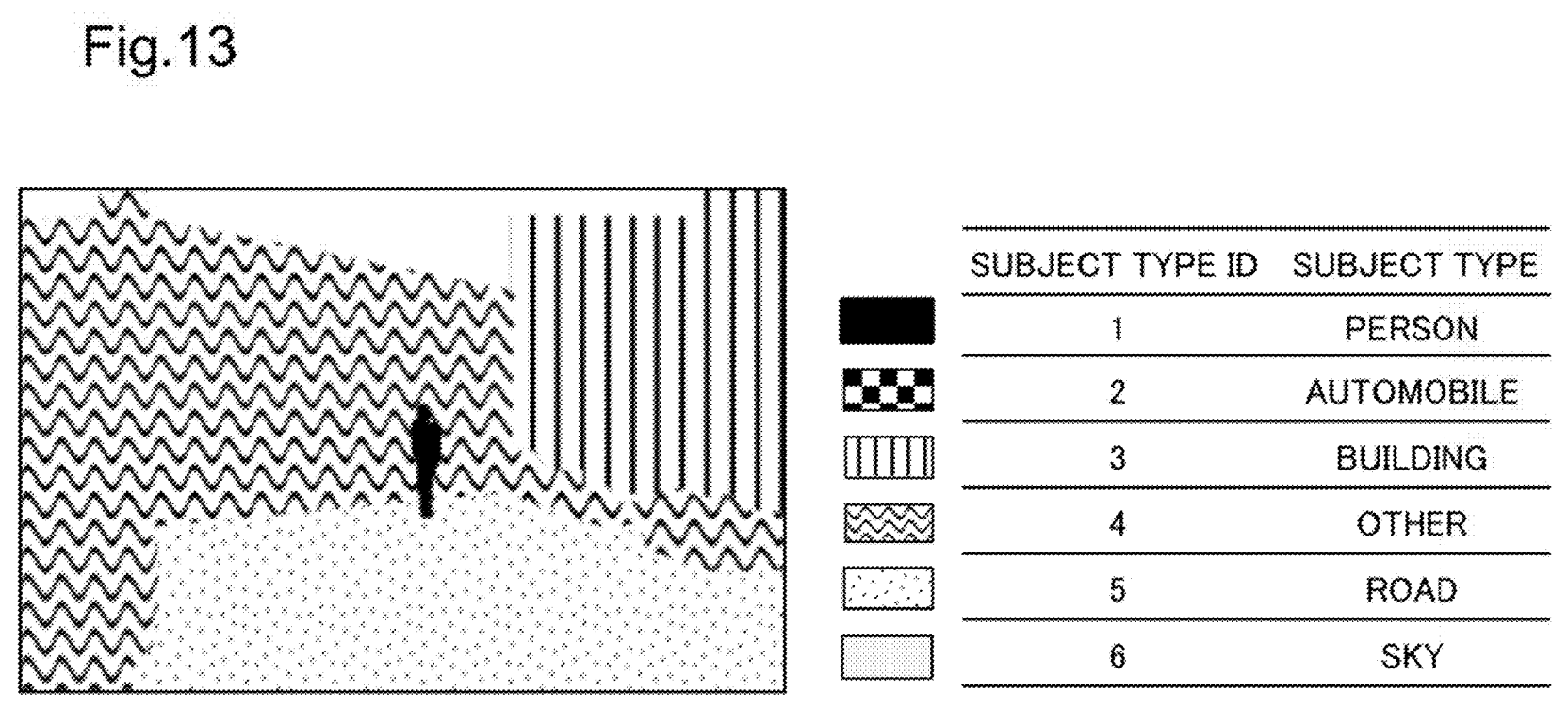

Next, the second processing unit 123 performs predetermined processing on the enlarged image and generates a processing result (step S142 in FIG. 12). For example, in a case where the first processing unit 121 performs region recognition as the first image processing, the second processing unit 123 performs region recognition on the enlarged image and generates a processing result. For example, in a case where the distant portion is a portion FR of FIG. 10, the second processing unit 123 enlarges the portion FR, performs region recognition on the enlarged image, and generates a processing result as illustrated in FIG. 13.

Next, the second processing unit 123 reduces the processing result for the enlarged image (step S143 in FIG. 12).

Figure 14:
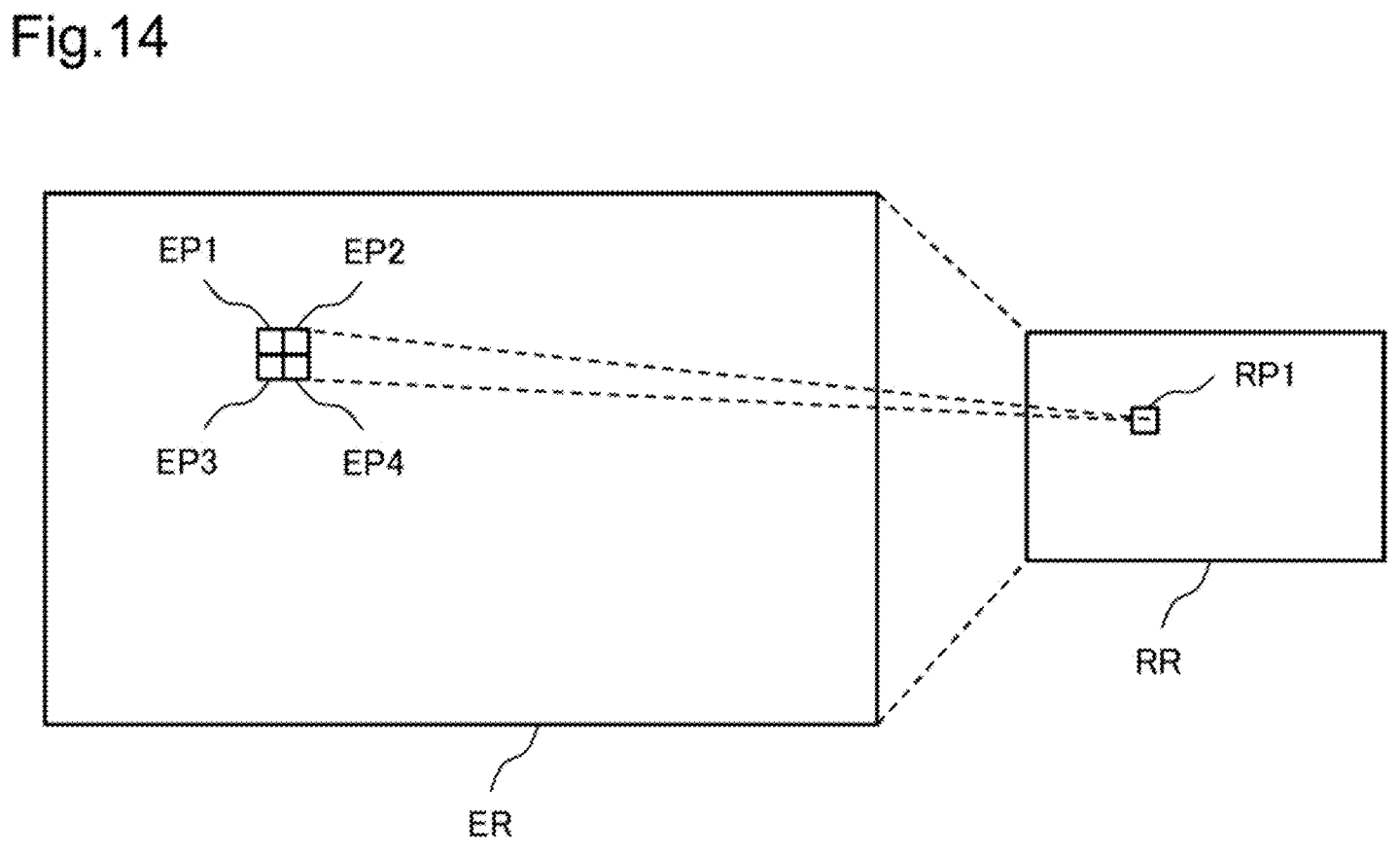

FIG. 14 is a diagram schematically illustrating the reduction of the processing result in a case where the predetermined processing performed in step S142 is region recognition. Hereinafter, a detailed description will be given with reference to FIG. 14.

The region recognition processing result is expressed, for example, by an image having the same resolution as the input image in an image format in which a subject type ID to which a pixel of the input image corresponding to each pixel belongs is stored in each pixel. A processing result ER in FIG. 14 is an example of a region recognition processing result for the enlarged image expressed in such a format. The resolution of the processing result ER is the same as the resolution of the enlarged image. Meanwhile, a processing result RR in FIG. 14 is an example of a processing result obtained by reducing the processing result ER. The resolution of the processing result RR is the same as the resolution of the image before being enlarged.

In the example of FIG. 14, the reduction of the processing result refers to setting a subject type ID to be stored in each pixel of the processing result RR based on the processing result ER.

First, the second processing unit 123 sequentially selects pixels of the processing result RR to be set. A pixel RP1 is an example of a pixel selected in this manner. Next, the second processing unit 123 extracts a pixel on the processing result ER corresponding to the position of the selected pixel on the processing result RR. In this case, the second processing unit 123 may extract a single corresponding pixel on the processing result ER or may extract a plurality of pixels including surroundings. Pixels EP1, EP2, EP3, and EP4 are examples of pixels extracted in this manner. Although the four pixels are extracted in the example of FIG. 14, any other number of pixels may be extracted.

Next, the second processing unit 123 determines a subject type ID to be stored in the pixel of the processing result RR based on the extracted pixels. As a method of this determination, various methods can be used. For example, the second processing unit 123 may use any of the following methods (A) to (D) as a method of the determination.

(A) Using the most frequent subject type ID
(B) Determining a subject type ID based on predetermined priorities of subject types
(C) Setting priorities of subject types from a region recognition processing result for the distant portion, and determining a subject type ID based on the priorities
(D) Setting priorities of subject types by comparing a region recognition processing result for the distant portion and a region recognition processing result for the acquired image, and determining a subject type ID based on the priorities Hereinafter, (A) to (D) will be described in detail.

The example (A) will be described in detail.

In the example (A), the second processing unit 123 determines a subject type ID that is most frequently included in the extracted pixels as the subject type ID to be stored. For example, in the example of FIG. 14, in a case where the extracted pixels are pixels EP1, EP2, EP3, and EP4 and subject type IDs thereof are EP1: 5 (road), EP2: 1 (person), EP3: 5 (road), and EP4: 5 (road), the second processing unit 123 determines the subject type ID to be stored in the pixel RP1 as 5 (road).

The example (B) will be described in detail.

In the example (B), the second processing unit 123 determines a subject type ID to be stored based on the predetermined priorities of subject types. For example, in the example of FIG. 14, in a case where the extracted pixels are pixels EP1, EP2, EP3, and EP4, subject type IDs thereof are EP1: 5 (road), EP2: 1 (person), EP3: 5 (road), and EP4: 5 (road), and the "person" is determined as a subject type to be prioritized, the second processing unit 123 can set the subject type ID to be stored in the pixel RP1 to 1 (person).

The form of the priority is not limited to the above-described example, and various forms can be used. For example, the form of the priority may be expressed as a weighting coefficient for each subject type. The method for determining a subject type ID based on the priorities is not limited to the above-described example, and various methods can be used. For example, the second processing unit 123 may determine the subject type ID to be stored by calculating the number of pixels for each subject type with respect to the extracted pixels, calculating an evaluation value by multiplying the number of pixels by the weighting coefficient for each subject type, and comparing the calculated evaluation values.

As described above, in the example (B), by determining the subject type ID to be stored based on the priorities of the subject types, the second processing unit 123 can appropriately include a subject to be preferentially recognized in the processing result.

The example (C) will be described in detail.

In the example (C), the second processing unit 123 sets priorities of subject types from a region recognition processing result for the enlarged image corresponding to the distant portion of the image, and determines a subject type ID to be stored based on the priorities.

For example, in the example of FIG. 14, the second processing unit 123 calculates the number of pixels for each subject type from the processing result ER, and sets a priority for each subject type according to a proportion of the calculated number of pixels. For example, in a case where the proportion of the number of pixels recognized as "person" is small, the "person" may be set as a subject type to be prioritized. As a result, for example, it is possible to prevent a region showing a "person" who appears small from being absorbed and lost by a region showing a surrounding subject (e.g., "road") after reduced. For example, in an image in which a person appears large, a subject type to be prioritized may be a surrounding subject (e.g., "road") instead of "person", but in this case as well, it is usual that a region showing the "person" is not lost. This is because a surrounding subject (e.g., "road") can be adopted as a subject type at a place near the boundary between the "person" and the surrounding subject (e.g., "road"), but the "person" is adopted as a subject type at a place where only the "person" appears, not near the boundary.

The second processing unit 123 is not limited to what has been described above, and may set a priority for each subject type using any other method or format.

After setting the priorities of the subject types, the second processing unit 123 determines a subject type ID to be stored based on the priorities of the subject types using the same method as described in the example (B) above.

In the example (C), by setting the priorities of the subject types from the region recognition processing result for the enlarged image corresponding to the distant portion of the image as described above, the second processing unit 123 can appropriately include, for example, a (rare) subject occupying a small proportion of the distant portion of the image in the processing result.

The example (D) will be described in detail.

In the example (D), the second processing unit 123 sets priorities of subject types by comparing a region recognition processing result for the enlarged image corresponding to the distant portion of the image and a region recognition processing result (first processing result) for the acquired image, and determines a subject type ID to be stored based on the priorities.

For example, in the example of FIG. 14, first, the second processing unit 123 specifies subject types included in the processing result ER. Next, the second processing unit 123 specifies subject types included in the first processing result generated by the first processing unit 121. Then, the second processing unit 123 specifies a subject type included in the processing result ER but not included in the first processing result or a subject type of which a proportion in the first processing result is equal to or smaller than a predetermined standard, and sets the specified subject type as a subject type to be prioritized. As an example, in a case where "person" is included as a subject type in the processing result ER and "person" is not included in the first processing result, the second processing unit 123 can set "person" as a subject type to be prioritized.

The second processing unit 123 is not limited to what has been described above, and may set a priority for each subject type using any other method or format. For example, the second processing unit 123 may specify a subject included in the processing result ER with a proportion in the first processing result being larger than the predetermined standard, and set a low priority to a type to which the specified subject belongs.

After setting the priorities of the subject types, the second processing unit 123 determines a subject type ID to be stored based on the priorities of the subject types using the same method as described in the example (B) above.

In the example (D), by setting the priorities of the subject types by comparing the region recognition processing result for the enlarged image corresponding to the distant portion of the image and the region recognition processing result (first processing result) for the acquired image as described above, the second processing unit 123 can appropriately include, for example, a subject that has not been sufficiently recognized during the region recognition for the acquired image but has been recognized during the region recognition for the enlarged image, in the processing result.

In the first example of second image processing, the second processing unit 123 reduces the processing result as described above, and generates the second processing result that is a reduced processing result.

Second Example of Second Image Processing

A second example of second image processing will be described.

First, the second processing unit 123 cuts out a distant portion of the image from the image acquired by the image acquisition unit 110 by using the distant portion specifying information generated by the distant portion specifying unit 122. Then, the second processing unit 123 performs image processing to which a setting different from that for the first image processing is applied on the cut-out image.

As the image processing performed by the second processing unit 123, various methods to which different settings are applied can be used. Specific examples will be described below.

For example, in a case where image recognition such as region recognition is performed in the second image processing, the second processing unit 123 can use, as the different setting, a setting capable of recognizing a subject type even with a smaller number of pixels. As an example, in a case where the first processing unit 121 performs region recognition using a setting in which a group of 8 pixels is set as a minimum unit for recognizing a subject type in the first image processing, the second processing unit 123 may perform region recognition using a setting in which a group of 4 pixels is set as a minimum unit for recognizing a subject type in the second image processing.

Furthermore, for example, in a case where image recognition such as region recognition is performed in the second image processing, the second processing unit 123 can use a setting capable of recognizing a different subject type as the different setting. As an example, in a case where the first processing unit 121 performs region recognition using a setting capable of recognizing six types, i.e., person, automobile, road, other, building, and sky, as subject types in the first image processing, the second processing unit 123 may perform region recognition using a setting capable of recognizing eight types, i.e., sign and traffic light, in addition to person, automobile, road, other, building, and sky, as subject types in the second image processing. For example, such a setting is useful in a case where it is highly necessary to recognize a distant sign or traffic light as compared with a nearby sign or traffic light that is likely to have already been viewed.

Here, a method of applying a different setting will be described.

Generally, a processing component that performs substantive processing on an image is called an image processing engine. In a case where the image processing is image recognition, the image processing engine includes a recognition model generated by learning or the like. The image processing engine may be implemented by software, or may be implemented by hardware.

The different setting can be performed, for example, by causing the image processing engine to read the setting during execution. In this case, the image processing device 10 causes the image processing engine included in the image processing device 10 to read the setting as described above at the time of activating the image processing device 10 or at any timing during execution. Then, the second processing unit 123 of the image processing device 10 performs second image processing using the image processing engine that has read the settings as described above.

In addition, the different setting can also be applied, for example, at the time of creating an image processing engine. In this case, an image processing engine creator designs and creates the image processing engine in such a way that the setting as described above is used. The second processing unit 123 of the image processing device 10 performs second image processing using the image processing engine created in this manner.

In the second example of second image processing, the second processing unit 123 executes the image processing by applying the different setting as described above, and generates the second processing result.

Next, the synthesis unit 124 of the image processing device 10 synthesizes the first processing result generated by the first processing unit 121 and the second processing result generated by the second processing unit 123 to generate a synthesis processing result that is a result of the synthesis (step S150 in FIG. 3).

As the synthesis performed by the synthesis unit 124, various methods can be used. Specific examples will be described below.

First Example of Synthesis

A first example of synthesis will be described. In the first example of synthesis, the synthesis unit 124 replaces a processing result corresponding to the distant portion of the image in the first processing result with the second processing result.

A case where region recognition is used as each of the first image processing and the second image processing, and an image in which a subject type ID is stored for each pixel is generated as each of the first processing result and the second processing result will be described. In this case, the synthesis unit 124 replaces subject type IDs in pixels corresponding to the distant portion of the image among the pixels of the first processing result with subject type IDs in the pixels of the second processing result. For example, in a case where a processing result as illustrated in FIG. 5 is generated as the first processing result and a processing result obtained by reducing the processing result as illustrated in FIG. 13 is generated as the second processing result, the synthesis unit 124 generates a synthesis processing result as illustrated in FIG. 15 through the replacement described above.

Figure 15:
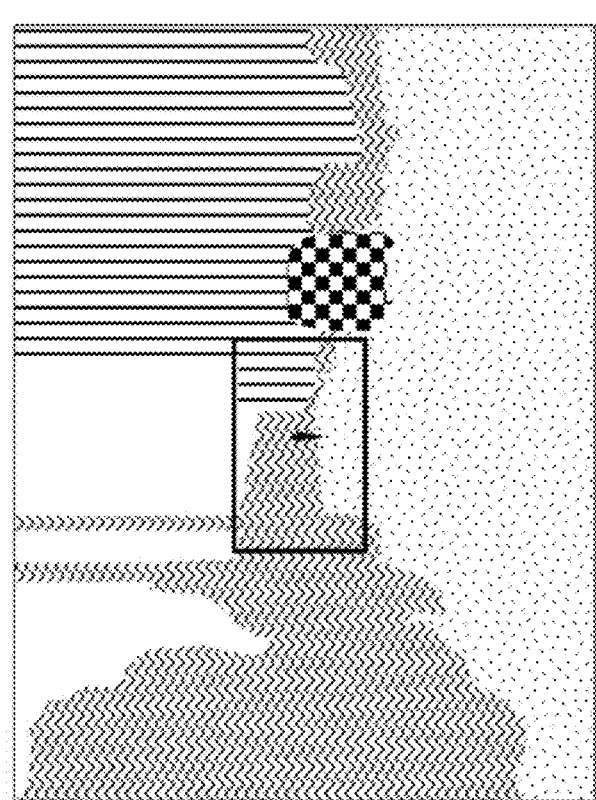
FIG. 15 is a diagram illustrating an example of a synthesis processing result according to the first example embodiment.

In FIG. 15, a portion corresponding to the second processing result (a portion corresponding to the distant portion of the image) in the synthesis processing result is indicated by a rectangle. The synthesis unit 124 may or may not include information representing a portion corresponding to the second processing result, such as a rectangle, in the synthesis processing result. For example, in a case where information representing a portion corresponding to the second processing result, such as a rectangle, is not necessary in displaying the synthesis processing result, the synthesis unit 124 may not include it in the synthesis processing result.

Second Example of Synthesis

A second example of synthesis will be described. In the second example of synthesis, the synthesis unit 124 integrates a processing result corresponding to the distant portion of the image in the first processing result and the second processing result.

As a method of the integration performed by the synthesis unit 124, various methods can be used. For example, in a case where region recognition is used as each of the first image processing and the second image processing, and an image in which a subject type ID is stored for each pixel is generated as each of the first processing result and the second processing result, the synthesis unit 124 may use any of the following methods (E) and (F) as a method of the integration.

(E) integration based on priorities of subject types
(F) integration based on degrees of reliability of subject types Hereinafter, (E) and (F) will be described in detail.

The example (E) will be described in detail.

In the example (E), the synthesis unit 124 integrates subject type IDs based on the priorities of the subject types. For example, in a case where the subject type ID stored in a certain pixel corresponding to the distant portion of the image in the first processing result is 5 (road), the subject type ID in the corresponding pixel in the second processing result is 1 (person), and "person" is set as a subject type to be prioritized, the synthesis unit 124 can determine the subject type ID of the pixel as 1 (person). Conversely, in a case where "road" is set as a subject type to be prioritized, the synthesis unit 124 can determine the subject type ID of the pixel as 5 (road). By doing so, the synthesis unit 124 can appropriately select and provide a necessary subject type from among the subject types recognized in the first image processing and the second image processing.

In the example (E), the integration of subject type IDs based on the priorities of the subject types is not limited thereto, and may be performed by any other method. For example, as described in the examples (A) to (D) of reduction, the synthesis unit 124 may statically or dynamically set priorities of subject types using any other method or format, and integrate subject IDs based on the priorities.

The example (F) will be described in detail.

As an example, an example in which the synthesis unit 124 integrates subject type IDs based on the degrees of reliability of the subject types will be described. Here, each of the first processing result and the second processing result includes a degree of reliability (e.g., at least 0.0 to at most 1.0) for each pixel together with the image in which the subject type ID is stored for each pixel. For example, in a case where the subject type ID stored in a certain pixel corresponding to the distant portion of the image in the first processing result is 5 (road), the degree of reliability thereof is 0.4, the subject type ID in the corresponding pixel in the second processing result is 1 (person), and the degree of reliability thereof is 0.7, the synthesis unit 124 determines the subject type ID of the pixel as 1 (person), which is more reliable.

As another example, an example in which the synthesis unit 124 integrates subject type IDs based on degrees of reliability of the subject types and predetermined weights of the first processing result and the second processing result will be described. For example, it is assumed that in a case where the subject type ID stored in a certain pixel corresponding to the distant portion of the image in the first processing result is 5 (road), the degree of reliability thereof is 0.8, the subject type ID in the corresponding pixel in the second processing result is 1 (person), and the degree of reliability thereof is 0.7, a weighting coefficient of the first processing result is set to 0.5, and a weighting coefficient of the second processing result is set to 0.5 and 1.0. For example, the synthesis unit 124 calculates an evaluation value by multiplying the degree of reliability and the weighting coefficient for each of the pixel of the first processing result and the pixel of the second processing result. In the above-described case, the synthesis unit 124 calculates 0.4 as an evaluation value for the pixel of the first processing result, and calculates 0.7 as an evaluation value for the pixel of the second processing result. Next, the synthesis unit 124 determines a subject type ID of the pixel by comparing the calculated evaluation values. In the above-described case, 1 (person) of the second processing result, which has a larger evaluation value, is determined as a subject identification ID for the pixel.

In the example (F), the integration of subject type IDs based on the degrees of reliability of the subject types is not limited thereto, and can be performed by the synthesis unit 124 using another reliability format, another evaluation value calculation method, another subject identification ID, and/or the like.

Next, the scene recognition unit 130 of the image processing device 10 performs scene recognition based on at least one of the first and second processing results generated by the first and second processing units 121 and 123 and the synthesis processing result generated by the synthesis unit 124, and generates a scene recognition result (step S160 in FIG. 3).

Here, the scene recognition is processing for recognizing a meaning of a scene shown in the image. As the scene recognition performed by the scene recognition unit 130, various methods can be used. For example, in a case where the image acquired by the image acquisition unit 110 is an image including a road, the scene recognition unit 130 can perform processing for recognizing a situation of the road as scene recognition. Hereinafter, a specific example of such processing for recognizing a situation of a road will be described with reference to FIGS. 16 and 17.

As an example, the scene recognition unit 130 can use, as the scene recognition, processing for determining a true/false value for each scene type, such as "there is a crosswalk ahead" or "there is a pedestrian ahead". FIG. 16 is a diagram illustrating an example of a scene recognition result from such scene recognition.

In addition, as an example, the scene recognition unit 130 can use, as the scene recognition, processing for determining a numerical value for each scene type, such as "a distance to an intersection ahead" or "the number of lanes in a traveling direction". FIG. 17 is a diagram illustrating an example of a scene recognition result from such scene recognition.

Here, the scene recognition unit 130 may determine a position of a subject (e.g., a position of a crosswalk or a position of an intersection) in the image together with the above-described true/false value or numerical value, and include the determined position of the subject in the scene recognition result.

The scene recognition unit 130 can perform the above-described scene recognition using a predetermined recognition model. The scene recognition unit 130 may use a recognition model created by any method. For example, the scene recognition unit 130 may perform scene recognition using a recognition model created by performing deep learning or learning according to another known method using teacher data in which a correct answer label of a scene is associated with a synthesis processing result.

Next, the output unit 140 of the image processing device 10 performs predetermined output based on at least one of the first and second processing results generated by the first and second processing units 121 and 123, the synthesis processing result generated by the synthesis unit 124, and the scene recognition result generated by the scene recognition unit 130. (step S170 in FIG. 3).

As a mode of the output performed by the output unit 140, various modes can be used. Hereinafter, specific examples of the output will be described. The output unit 140 can provide output using one or more of the following specific examples.

First Example of Output

A first example of output will be described. In the first example of output, the image acquired by the image acquisition unit 110 is an image including a road. In addition, it is assumed that the image processing device 10 and the vehicle traveling on the road are communicably connected to each other. In the first example of output, the output unit 140 provides information to an occupant of the vehicle traveling on the road as the output.

For example, the output unit 140 can issue an instruction to be displayed on a display device installed in the vehicle traveling on the road as the output.

As an example, in a case where the synthesis unit 124 generates a region recognition processing result image as illustrated in FIG. 15 as the synthesis processing result, the output unit 140 may issue an instruction to display the image as illustrated in FIG. 15 on the display device. Furthermore, based on the region recognition processing result as illustrated in FIG. 15, the output unit 140 may perform processing for emphasizing a region in which a subject (e.g., a person or an automobile) to be gazed appears on the acquired image as illustrated in FIG. 4, and issue an instruction to display the processed image on the display device. In addition, the output unit 140 may issue an instruction to display text information for each subject type shown in the image on the display device together with the image.

In addition, as an example, in a case where the scene recognition unit 130 generates a result "there is a pedestrian ahead" as illustrated in FIG. 16 as the scene recognition result, the output unit 140 may issue an instruction to display text information "there is a pedestrian ahead" on the display device.

Furthermore, for example, the output unit 140 can issue an instruction for announcement through a voice output device installed in the vehicle traveling on the road as the output.

As an example, in a case where the scene recognition unit 130 generates a result "there is a pedestrian ahead" as illustrated in FIG. 16 as the scene recognition result, the output unit 140 may issue an instruction to announce text information "there is a pedestrian ahead" as a voice through the voice output device.

The output unit 140 is not limited to the above-described example, and can provide information to an occupant of the vehicle traveling on the road in any other mode.

Second Example of Output

A second example of output will be described. In the second example of output, the image acquired by the image acquisition unit 110 is an image including a road. In addition, it is assumed that the image processing device 10 and the vehicle traveling on the road are communicably connected to each other. In the second example of output, the output unit 140 issues a driving control instruction to the vehicle traveling on the road as the output.

As the driving control instruction performed by the output unit 140, various methods can be used.

For example, the output unit 140 can instruct the vehicle traveling on the road to brake, steer the steering wheel, and turn on or off the light. As an example, in a case where the scene recognition unit 130 generates a result "there is a pedestrian ahead" as illustrated in FIG. 16 as the scene recognition result, the output unit 140 may instruct the vehicle traveling on the road to brake.

The output unit 140 is not limited thereto, and can issue a driving control instruction to the vehicle traveling on the road in any other mode. The vehicle traveling on the road may be an automatic driving vehicle or a manual driving vehicle.

Third Example of Output

A third example of output will be described. In the third example of output, the output unit 140 provides information to a manager. Here, the manager includes various persons such as a manager of a vehicle, a manager and a supervisor of a road, and a manager and a supervisor of another facility. It is assumed that the manager uses a terminal device, and the image processing device 10 and the terminal device are communicably connected to each other. The terminal device used by the manager may be installed close to the image processing device 10, may be installed remotely from the image processing device 10, or may be a portable terminal device.

As a mode of the provision of the information to the manager performed by the output unit 140, various modes can be used. For example, the output unit 140 can instruct the terminal device of the manager to present the first processing result and the second processing result, the synthesis processing result, and/or the scene recognition result as the output. In this case, the output unit 140 may issue an instruction to display the first processing result and the second processing result, the synthesis processing result, and/or the scene recognition result in a mode similar to the mode described in the first example of output, or announce the first processing result and the second processing result, the synthesis processing result as a voice.

Fourth Example of Output

A fourth example of output will be described.

In the fourth example of output, the output unit 140 transmits information to an external device that is not illustrated. Here, the external device includes various devices such as a display device, a storage device, and an analysis device. It is assumed that the image processing device 10 and the external device are communicably connected to each other. The output unit 140 transmits, for example, information such as the first processing result and the second processing result, the synthesis processing result, the scene recognition result, and/or the like to such an external device. The external device can perform various types of processing such as displaying the received information on a screen, accumulating the received information, and additional analysis based on the received information.

When what have been described above are done, the operation according to the first example embodiment is completed.

Note that the processing order illustrated in FIGS. 4, 6, and 12 is an example, and the order may be changed within a range in which the processing result does not change, or some processing steps may be performed in parallel. For example, the image processing device 10 may change the order between the processing step S120 and the series of processing steps S130 and S140 in FIG. 4, or may perform some processing steps in parallel.

<Description of Effect>

According to the first example embodiment, at the time of performing image processing on a captured image, a distant subject can be accurately recognized. This is because the distant portion specifying unit 122 specifies a distant portion of the captured image, and the second processing unit performs predetermined second image processing on the specified distant portion of the image.

In addition, according to the first example embodiment, at the time of performing image processing on a captured image, a processing load can be reduced. This is because since the distant portion specifying unit 122 specifies a distant portion of the captured image and the second processing unit performs predetermined second image processing on the specified distant portion of the image, it is not necessary to perform the second image processing in the range excluding the distant portion of the image.

Second Example Embodiment

A second example embodiment will be described.

<Description of Configuration>

First, a configuration according to the second example embodiment will be described.

Figure 18:
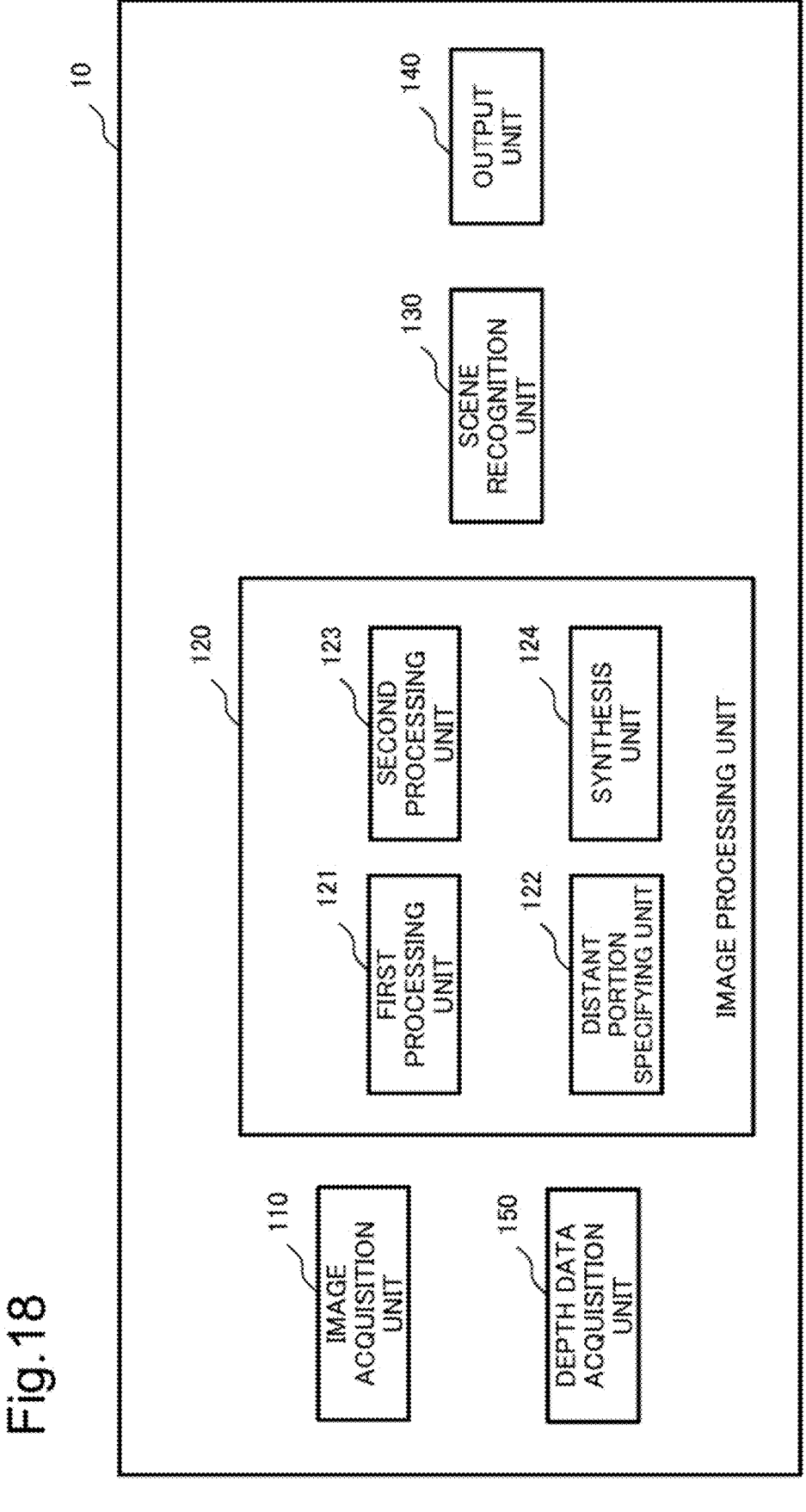
FIG. 18 is a diagram illustrating examples of functional blocks of an image processing device 10 according to a second example embodiment.

FIG. 18 is a diagram illustrating functional blocks of an image processing device 10 according to the second example embodiment. Referring to FIG. 18, the image processing device 10 according to the second example embodiment is different from that according to the first example embodiment in that a depth data acquisition unit 150 is included. The other components in the second example embodiment are similar to those in the first example embodiment. The components similar to those in the first example embodiment are denoted by the same reference signs as those in FIGS. 1 and 2, and detailed description thereof will be omitted.

The depth data acquisition unit 150 functions as a means for acquiring depth data.

Here, the depth data is data indicating a depth with respect to an object. The depth data is expressed, for example, in the form of an image (referred to as a depth image) in which a distance to the object is stored in each pixel. As a method by which the depth data acquisition unit 150 acquires the depth data, various methods can be used.

For example, in a case where an external measurement device that is not illustrated measures depth data, the depth data acquisition unit 150 may acquire the measured depth data from the measurement device through communication or the like. Such a measurement device includes a light detection and ranging or laser imaging detection and ranging (LIDAR), a millimeter wave radar, a stereo camera, and a time of flight (ToF) camera.

Furthermore, for example, the depth data acquisition unit 150 may generate depth data using the image acquired by the image acquisition unit 110. A method for estimating a depth from a two-dimensional image using deep learning or the like, which is called depth estimation, has been known, and the depth data acquisition unit 150 can generate depth data using such depth estimation. In addition, when an external processing device that is not illustrated performs such depth estimation, the depth data acquisition unit 150 may acquire the generated depth data from the processing device through communication or the like.

<Description of Operation>

Next, an operation according to the second example embodiment will be described.

Figure 19:
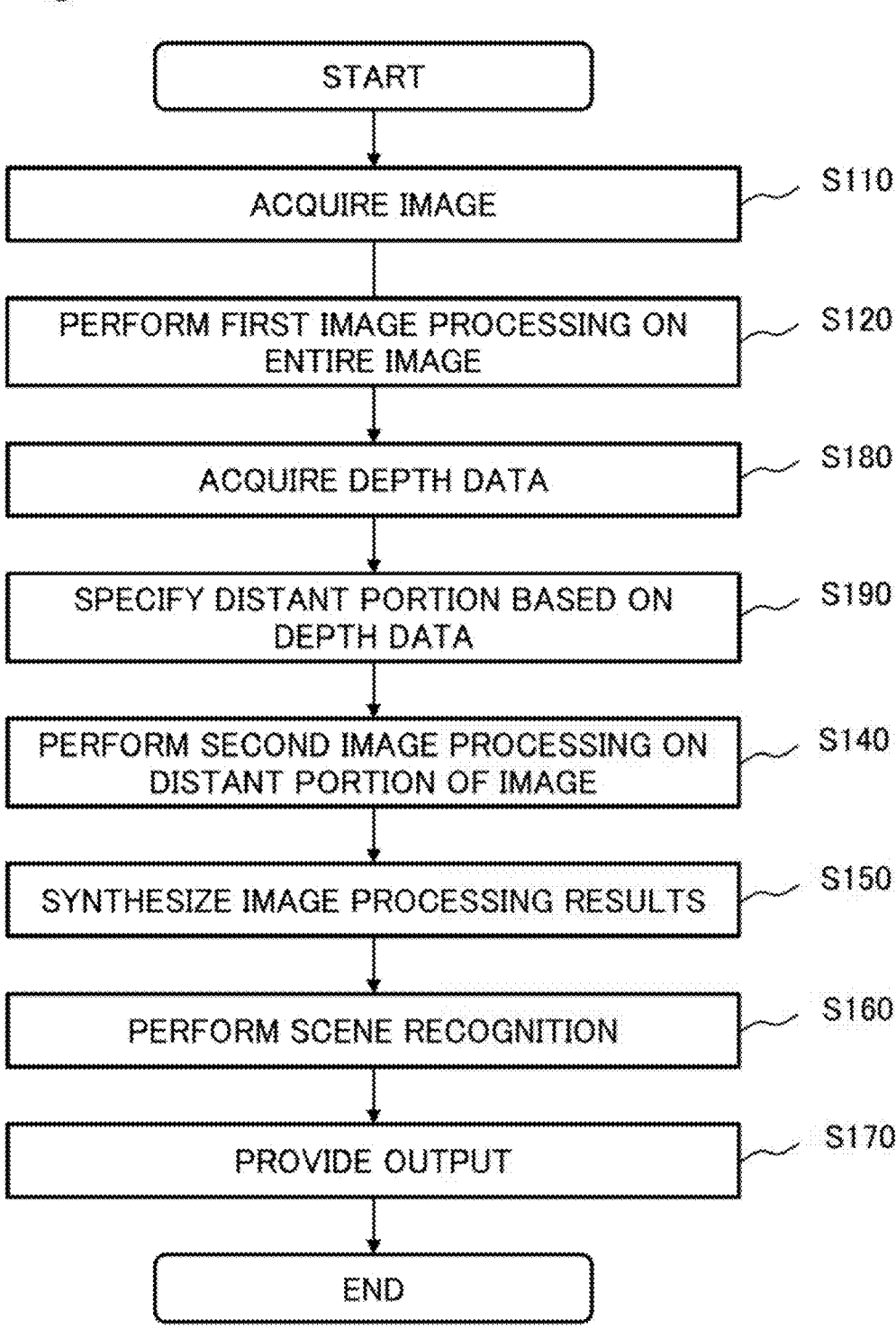
FIG. 19 is a flowchart illustrating an example of an operation of the image processing device 10 according to the second example embodiment.

FIG. 19 is a flowchart illustrating an operation of the image processing device 10 according to the second example embodiment. Operations similar to those in the first example embodiment are denoted by the same reference signs as those in FIG. 3, and detailed description thereof will be omitted.

The image acquisition unit 110 of the image processing device 10 acquires a captured image from the imaging device 20 (step S110 in FIG. 19).

The first processing unit of the image processing device 10 performs predetermined first image processing on the image acquired by the image acquisition unit 110 and generates a first processing result (step S120 in FIG. 19).

Figure 20:
FIG. 20 is a diagram illustrating an example of depth data according to the second example embodiment.

Next, the depth data acquisition unit 150 of the image processing device 10 acquires depth data using the method as described above (step S180 in FIG. 19). For example, the depth data acquisition unit 150 acquires a depth image as illustrated in FIG. 20 as the depth data. In FIG. 20, the depth is represented by shading, and a deeper (closer) portion has a smaller depth and a brighter (farther) portion has a larger depth.

Next, the distant portion specifying unit 122 of the image processing device 10 specifies a distant portion based on the depth data acquired by the depth data acquisition unit 150, and generates distant portion specifying information (step S190 in FIG. 19).

As a method by which the distant portion specifying unit 122 specifies the distant portion based on the depth data, various methods can be used. Specific examples will be described below.

First Example of how to Specify Distant Portion Based on Depth Data

Figure 21:
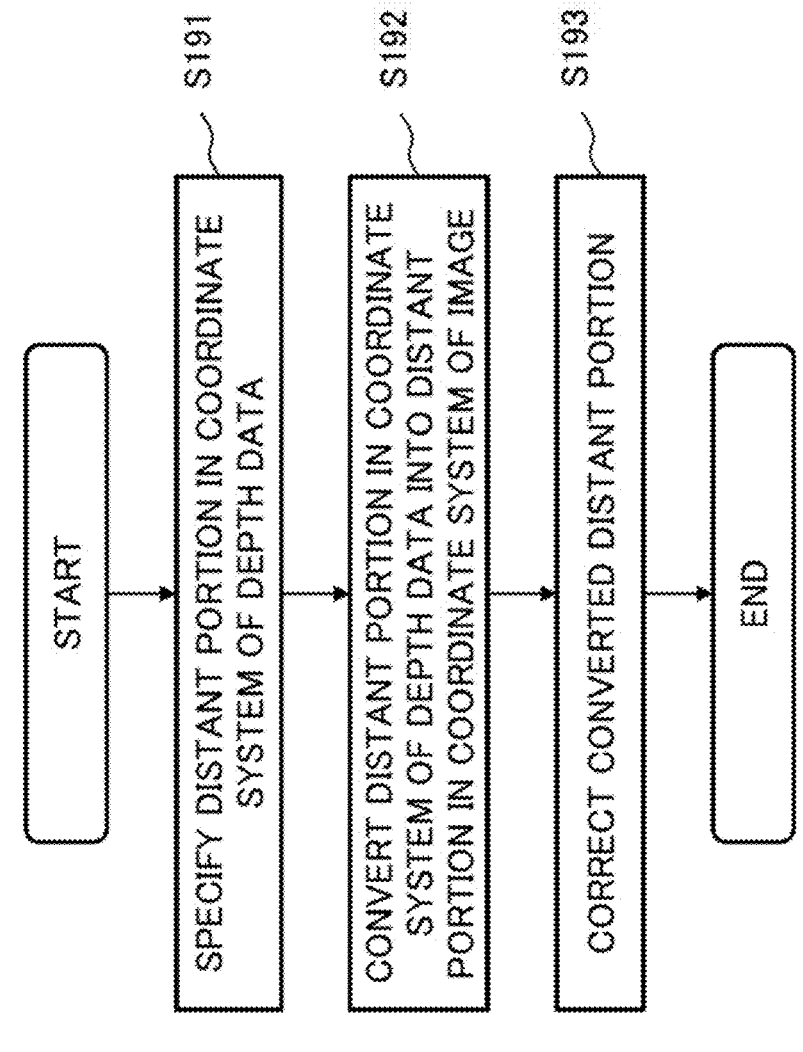
FIG. 21 is a flowchart illustrating an example of an operation of a distant portion specifying unit 122 according to the second example embodiment.

A first example of how to specify a distant portion based on depth data will be described. FIG. 21 is a flowchart illustrating an operation of the distant portion specifying unit 122 based on depth data.

Based on the depth data acquired by the depth data acquisition unit 150, the distant portion specifying unit 122 specifies a distant portion in a coordinate system of the depth data (step S191 in FIG. 21).

As this specific method performed by the distant portion specifying unit 122, various methods can be used.

For example, the distant portion specifying unit 122 can extract a point having the largest depth among the points included in the depth data, specify a predetermined portion including the point, and set the predetermined portion as a distant portion in the coordinate system of the depth data. Alternatively, for example, the distant portion specifying unit 122 can extract a group of points each having a depth equal to or greater than a predetermined threshold among the points included in the depth data, specify a predetermined portion including the extracted group of points, and set the predetermined portion as a distant portion in the coordinate system of the depth data. The shape of the distant portion in the coordinate system of the depth data may be, for example, a rectangle, a polygon other than the rectangle, a circle, an ellipse, or another shape.

Next, the distant portion specifying unit 122 converts the specified distant portion in the coordinate system of the depth data into a distant portion in a coordinate system of the image (step S192 in FIG. 21).

Here, processing for obtaining a formula for conversion between the coordinate system of the depth data and the coordinate system of the image is called calibration. As such a calibration method, various methods are known, such as obtaining the conversion formula based on a small number of points in the coordinate system of the depth data and a small number of points in the coordinate system of the image corresponding thereto. The distant portion specifying unit 122 converts the distant portion in the coordinate system of the depth data into the distant portion in the coordinate system of the image, for example, using the conversion formula obtained by any of such various methods.

Next, the distant portion specifying unit 122 corrects the distant portion in the coordinate system of the image obtained by the conversion. (step S193 in FIG. 21).

As the correction performed by the distant portion specifying unit 122, various methods can be used. For example, when the shape of the distant portion in the coordinate system of the image obtained by the conversion is not a rectangle, the distant portion specifying unit 122 may perform correction to approximate the shape to the rectangle. However, the distant portion specifying unit 122 is not limited thereto, and may perform correction to approximate the shape to a polygon other than the rectangle, a circle, an ellipse, or another shape, or may perform correction to any of the various other shapes. In addition, when no correction is necessary for the distant portion in the coordinate system of the image obtained by the conversion, the distant portion specifying unit 122 may omit the correction processing.

Second Example of how to Specify Distant Portion Based on Depth Data

Figure 22:
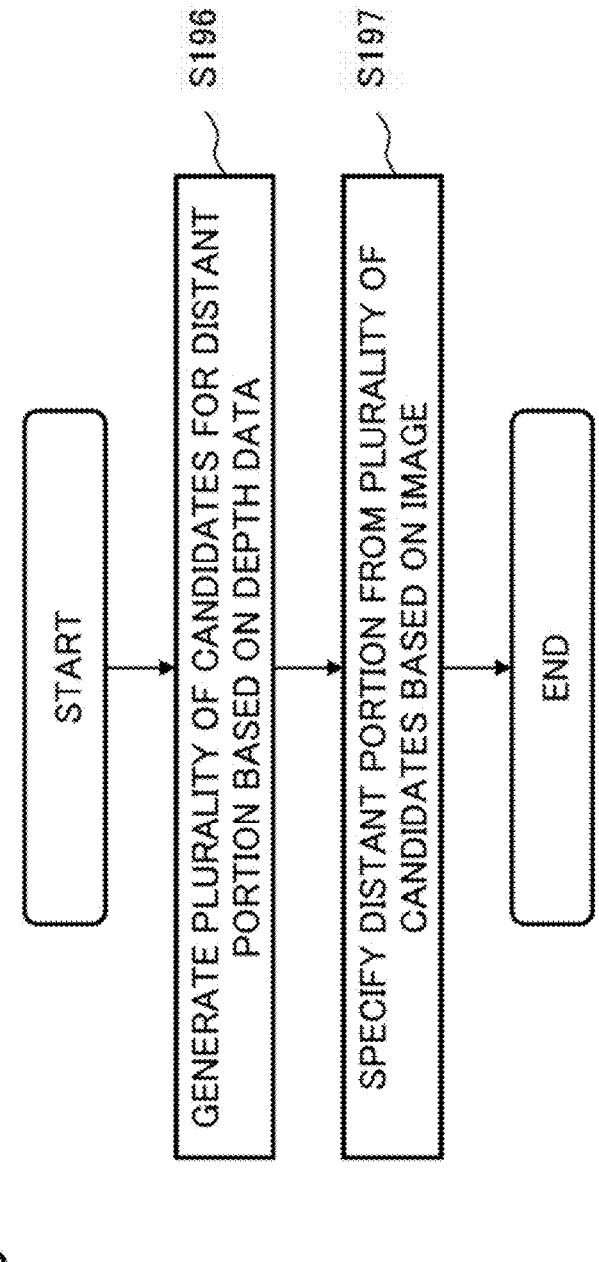
FIG. 22 is a flowchart illustrating another example of an operation of the distant portion specifying unit 122 according to the second example embodiment.

A second example of how to specify a distant portion based on depth data will be described. In the second example of how to specify a distant portion based on depth data, the distant portion is specified based on the image acquired by the image acquisition unit 110 in addition to the depth data. FIG. 22 is a flowchart illustrating an operation of the distant portion specifying unit 122 based on depth data.

The distant portion specifying unit 122 generates a plurality of candidates for the distant portion based on the depth data acquired by the depth data acquisition unit 150 (step S196 in FIG. 22).

First, the distant portion specifying unit 122 specifies a plurality of candidates for the distant portion in the coordinate system of the depth data based on the depth data acquired by the depth data acquisition unit 150.

As the above-described specific method performed by the depth data acquisition unit 150, various methods can be used. For example, the distant portion specifying unit 122 first extracts a group of points each having a depth equal to or greater than a predetermined threshold among the points included in the depth data. Next, the distant portion specifying unit 122 divides the extracted group of points into groups of close-distance points in the coordinate system of the depth data. Subsequently, for each of the plurality of divided groups, the distant portion specifying unit 122 specifies a portion including the points included in the group. The distant portion specifying unit 122 can set the plurality of portions as a plurality of candidates for the distant portion in the coordinate system of the depth data.

Next, the distant portion specifying unit 122 converts each of the plurality of candidates specified for the distant portion in the coordinate system of the depth data into a distant portion in the coordinate system of the image. As a method of this conversion, various methods as described in the first example of how to specify a distant portion based on depth data can be used.

Next, the distant portion specifying unit 122 corrects each of the plurality of candidates for the distant portion in the coordinate system of the image obtained by the conversion. As a method of this correction, various methods as described in the first example of how to specify a distant portion based on depth data can be used. In addition, when no corrections are necessary for the candidates for the distant portion in the coordinate system of the image obtained by the conversion, the distant portion specifying unit 122 may omit the correction processing.

As a result, the distant portion specifying unit 122 can obtain a plurality of candidates for the distant portion based on the depth data acquired by the depth data acquisition unit 150.

Subsequently, the distant portion specifying unit 122 specifies a distant portion from the plurality of candidates for the distant portion generated as described above based on the image acquired by the image acquisition unit 110 (step S197 in FIG. 22).

The distant portion specifying unit 122 performs image recognition on the image acquired by the image acquisition unit 110. Here, the image recognition performed by the distant portion specifying unit 122 is, for example, region recognition. However, the image recognition is not limited thereto, and may be object recognition or another type of image recognition. In a case where region recognition is performed, the distant portion specifying unit 122 may use simple region recognition as described in the first example of how to estimate a vanishing point according to the first example embodiment.

Next, the distant portion specifying unit 122 calculates an evaluation value for each of the plurality of candidates for the distant portion based on an image recognition processing result. For example, the distant portion specifying unit 122 can give a larger evaluation value to a candidate for the distant portion including a wider range recognized as a predetermined subject type (e.g., road) as an image recognition processing result.

The distant portion specifying unit 122 specifies a candidate having the largest calculated evaluation value as the distant portion.

After specifying the distant portion as described above, the distant portion specifying unit 122 generates distant portion specifying information expressing the distant portion in a predetermined format.

Next, the second processing unit 123 of the image processing device 10 performs predetermined second image processing different from the first image processing on the distant portion of the image acquired by the image acquisition unit 110 based on the distant portion specifying information generated by the distant portion specifying unit 122, and generates a second processing result (step S140 in FIG. 19).

Next, the synthesis unit 124 of the image processing device 10 synthesizes the first processing result generated by the first processing unit 121 and the second processing result generated by the second processing unit 123 to generate a synthesis processing result that is a result of the synthesis (step S150 in FIG. 19).

Next, the scene recognition unit 130 of the image processing device 10 performs scene recognition based on at least one of the first and second processing results generated by the first and second processing units 121 and 123 and the synthesis processing result generated by the synthesis unit 124, and generates a scene recognition result (step S160 in FIG. 19).

Next, the output unit 140 of the image processing device 10 performs predetermined output based on at least one of the first and second processing results generated by the first and second processing units 121 and 123, the synthesis processing result generated by the synthesis unit 124, and the scene recognition result generated by the scene recognition unit 130. (step S170 in FIG. 19).

When what have been described above are done, the operation according to the second example embodiment is completed.

Note that the processing order illustrated in FIGS. 19, 21, and 22 is an example, and the order may be changed within a range in which the processing result does not change, or some processing steps may be performed in parallel. For example, the image processing device 10 may change the order between the processing step S120 and the series of processing steps S180, S190, and S140 in FIG. 19, or may perform some processing steps in parallel.

<Description of Effect>
According to the second example embodiment, at the time of performing image processing on a captured image, a distant portion can be accurately specified. This is because the depth data acquisition unit 150 acquires depth data, and the distant portion specifying unit 122 specifies a distant portion of the captured image based on the acquired depth data.

Third Example Embodiment

A third example embodiment will be described.
<Description of Configuration>
A configuration according to the third example embodiment will be described. The configuration according to the third example embodiment is a minimum configuration of each example embodiment.

Figure 23:
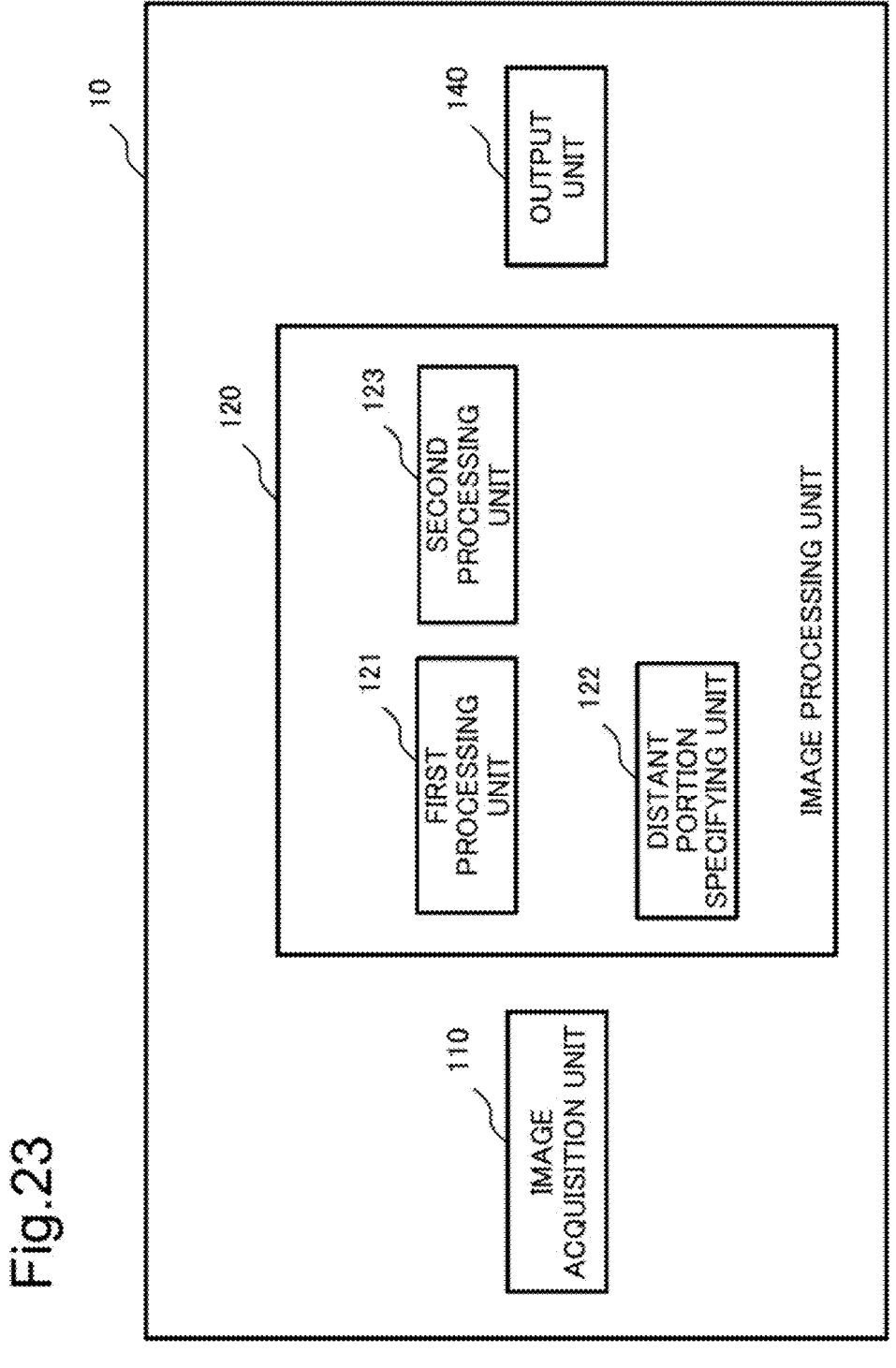
FIG. 23 is a diagram illustrating examples of functional blocks of an image processing device 10 according to a third example embodiment.

FIG. 23 is a diagram illustrating functional blocks of an image processing device 10 according to the third example embodiment.

Referring to FIG. 23, the image processing device 10 includes an image acquisition unit 110, an image processing unit 120, and an output unit 140. Furthermore, the image processing unit 120 includes a first processing unit 121, a distant portion specifying unit 122, and a second processing unit 123.

Each component of the image processing device 10 functions as a means similar to the corresponding component in the image processing device 10 in the first example embodiment or the like.
<Description of Operation>
An operation according to the third example embodiment will be described.

Figure 24:
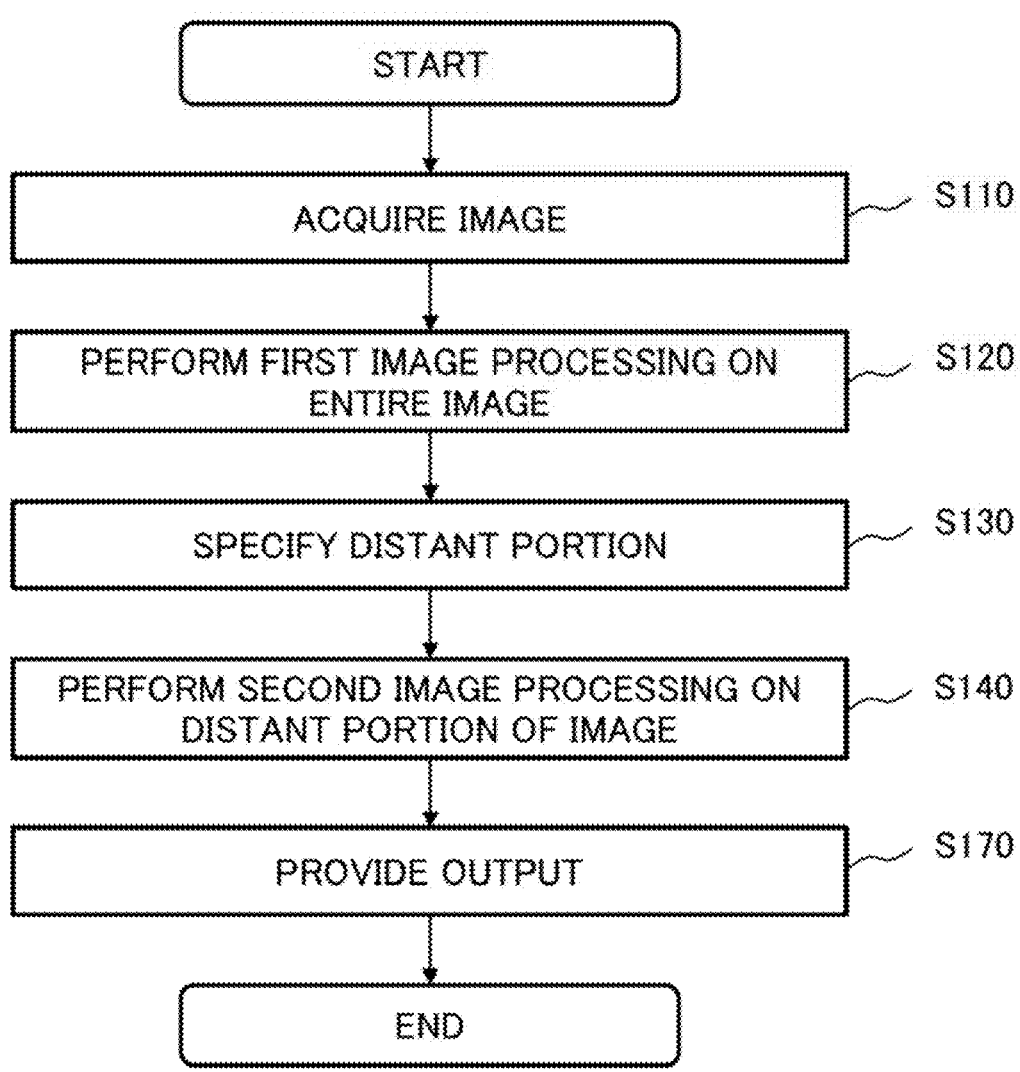
FIG. 24 is a flowchart illustrating an example of an operation of the image processing device 10 according to the third example embodiment.

FIG. 24 is a flowchart illustrating an operation of the image processing device 10 according to the third example embodiment. Operations similar to those in the first example embodiment are denoted by the same reference signs as those in FIG. 3, and detailed description thereof will be omitted.

The image acquisition unit 110 of the image processing device 10 acquires a captured image from the imaging device 20 (step S110 in FIG. 24).

The first processing unit of the image processing device 10 performs predetermined first image processing on the image acquired by the image acquisition unit 110 and generates a first processing result (step S120 in FIG. 24).

The distant portion specifying unit 122 of the image processing device 10 specifies a distant portion based on the image acquired by the image acquisition unit 110 (step S130 in FIG. 24).

The second processing unit 123 of the image processing device 10 performs predetermined second image processing different from the first image processing on the distant portion of the image acquired by the image acquisition unit 110 based on the distant portion specifying information generated by the distant portion specifying unit 122, and generates a second processing result (step S140 in FIG. 24).

The output unit 140 of the image processing device 10 performs predetermined output based on the first processing result generated by the first processing unit 121 and the second processing result generated by the second processing unit 123 (step S170 in FIG. 3).

When what have been described above are done, the operation according to the third example embodiment is completed.

Note that the processing order illustrated in FIG. 24 is an example, and the order may be changed within a range in which the processing result does not change, or some processing steps may be performed in parallel. For example, the image processing device 10 may change the order between the processing step S120 and the series of processing steps S130 and S140 in FIG. 24, or may perform some processing steps in parallel.

<Description of Effect>

According to the third example embodiment, at the time of performing image processing on a captured image, a distant subject can be accurately recognized.

[Modifications]

Although the example embodiments of the present invention have been described above, the present invention is not limited to the above-described example embodiments, and further modifications, substitutions, and adjustments can be made without departing from the basic technical idea of the present invention.

For example, in each of the above-described example embodiments, an example in which the first processing unit 121 and the second processing unit 123 of the image processing device 10 perform region recognition as image processing has been mainly described, but the first processing unit 121 and the second processing unit 123 are not limited thereto, and may perform image recognition other than the region recognition as image processing. As one type of image recognition, object recognition for estimating a shape (e.g., a rectangle) surrounding a subject included in an image and a type of the subject has been known, and the first processing unit 121 and the second processing unit 123 may perform the object recognition as image processing.

Furthermore, for example, the first processing unit 121 and the second processing unit 123 of the image processing device 10 may perform image processing other than the image recognition, e.g., image conversion processing, as image processing. As one type of image conversion processing, super resolution for generating a high-definition image using pixel interpolation or the like is known, and the first processing unit 121 and the second processing unit 123 may perform this super resolution as image processing. As a result, a high-quality processing result can be obtained for the distant portion.

Furthermore, for example, when the first processing result satisfies a predetermined condition, the image processing device 10 may cause the distant portion specifying unit 122 to omit processing for specifying a distant portion and cause the second processing unit 123 to omit second image processing. As an example, in a case where the first processing unit 121 performs image recognition such as region recognition or object recognition as the first image processing and generates a degree of reliability thereof together with an image recognition result as a first processing result, when the degree of reliability is sufficiently large, the image processing device 10 may cause the distant portion specifying unit 122 to omit processing for specifying a distant portion and cause the second processing unit 123 to omit second image processing. By omitting the processing in this manner, it is possible to reduce the processing loads in the distant portion specifying unit 122 and the second processing unit 123.

Furthermore, for example, it has been described in each of the above-described example embodiments that the image processing device 10 acquires an image from the imaging device 20, but the image processing device 10 is not limited thereto, and may acquire an image recorded in advance in a storage device or a recording medium to perform image processing (offline image processing) on the image. As an example of such offline image processing, the image processing device 10 may perform image processing on images recorded in advance before and after an accident occurs on a road. As a result of such image processing, the image processing device 10 can provide information useful for ex-post detailed analysis of the accident, for example, information indicating that there was a person passing through a distant crosswalk before the occurrence of the accident.

Furthermore, for example, it has been described in each of the above-described example embodiments that the image processing device 10 specifies a distant portion of a captured image and performs predetermined second image processing on the distant portion, but the image processing device 10 is not limited thereto, and may specify a portion to be gazed using a standard other than the "distant portion". For example, in the image processing device 10, the distant portion specifying unit 122 may specify a portion to be gazed using a standard other than the "distant portion" with respect to the captured image, and the second processing unit 123 may perform predetermined second image processing on the portion to be gazed.

[Hardware Configuration]

In each of the above-described example embodiments, each of the components of the image processing device 10 represents a functional block. Some or all of the components of the image processing device 10 may be achieved by any combination of a program with a computer 1000.

Figure 25:
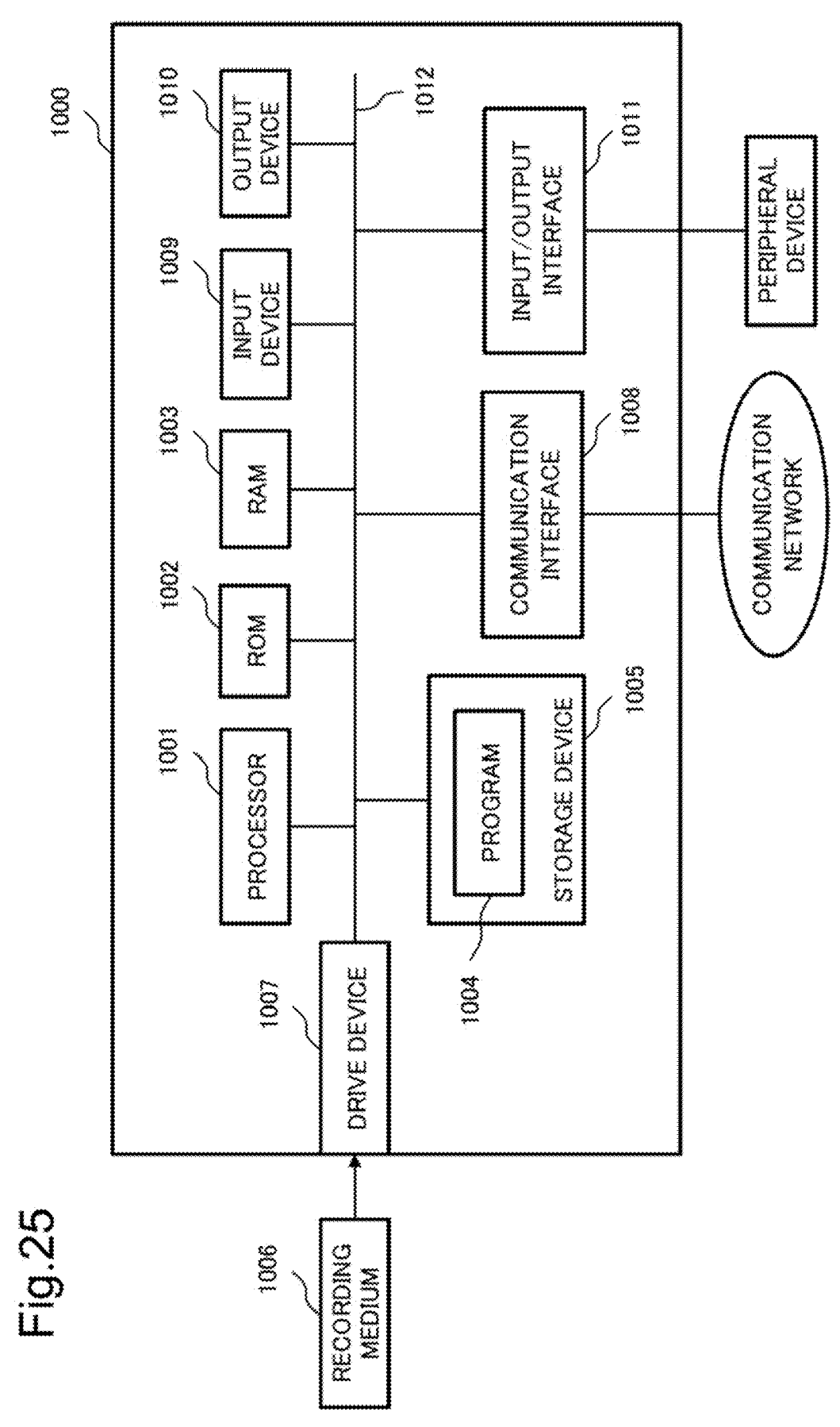
FIG. 25 is a block diagram illustrating an example of a hardware configuration of a computer 1000.

FIG. 25 is a block diagram illustrating an example of a hardware configuration of the computer 1000. Referring to FIG. 25, the computer 1000 includes, for example, a processor 1001, a read only memory (ROM) 1002, a random access memory (RAM) 1003, a program 1004, a storage device 1005, a drive device 1007, a communication interface 1008, an input device 1009, an output device 1010, an input/output interface 1011, and a bus 1012.

The program 1004 includes instructions for implementing each function of each device. The program 1004 is stored in advance in the ROM 1002, the RAM 1003, or the storage device 1005. The processor 1001 implements each function of each device by executing the instructions included in the program 1004. For example, the processor 1001 of the image processing device 10 executes the instructions included in the program 1004 to implement the functions of the image acquisition unit 110, the image processing unit 120, and the like.

The drive device 1007 performs reading and writing from and to the recording medium 1006. The communication interface 1008 provides an interface with a communication network. The input device 1009 is, for example, a mouse, a keyboard, or the like, and receives an input of information from an operator or the like. The output device 1010 is, for example, a display, and outputs (displays) information to an operator or the like. The input/output interface 1011 provides an interface with a peripheral device. The bus 1012 connects the components of the hardware to each other. The program 1004 may be supplied to the processor 1001 via a communication network, or may be stored in the recording medium 1006 in advance, read by the drive device 1007, and supplied to the processor 1001.

Note that the hardware configuration illustrated in FIG. 25 is an example, and other components may be added or some components may not be included.

There are various modifications to the method for implementing the image processing device 10. For example, each component of the image processing device 10 may be implemented by any combination of a program with a different computer. In addition, a plurality of components included in each device may be implemented by any combination of a program with one computer.

In addition, some or all of the components of each device may be implemented by a general-purpose circuit or a dedicated circuit, or a combination of a general-purpose circuit and a dedicated circuit. These circuits may be configured by a single chip or may be configured by a plurality of chips connected to each other via a bus. Some or all of the components of each device may be implemented by a combination of a program with the above-described circuits or the like.

In addition, in a case where some or all of the components of each device are implemented by a plurality of computers, circuits, or the like, the plurality of computers, circuits, or the like may be arranged in a centralized manner or in a distributed manner.

While the present disclosure has been particularly shown and described with reference to example embodiments thereof, the present disclosure is not limited to these example embodiments. It will be understood by those skilled in the art that various changes in form and details may be made therein within the scope of the present disclosure. In addition, the configurations according to the respective example embodiments can be combined with each other without departing from the scope of the present disclosure.

Some or all of the above-described example embodiments may be described as in the following supplementary notes, but are not limited to the following supplementary notes.

(Supplementary Note 1)

An image processing device including:

an image acquisition means configured to acquire an image captured by an imaging device;

a first processing means configured to perform first image processing on the image;

a distant portion specifying means configured to specify a distant portion of the image;

a second processing means configured to perform second image processing on the distant portion of the image, the second image processing being different from the first image processing; and an output means configured to provide output based on a processing result of the first image processing and a processing result of the second image processing.

(Supplementary Note 2)

The image processing device according to supplementary note 1, further including a synthesis means configured to synthesize the processing result of the first image processing and the processing result of the second image processing.

(Supplementary Note 3)

The image processing device according to supplementary note 1 or 2, in which, as the second image processing, the second processing means enlarges the distant portion of the image, performs predetermined processing on the enlarged image, and reduces a processing result of the predetermined processing.

(Supplementary Note 4)

The image processing device according to supplementary note 3, in which the first processing means performs region recognition as the first image processing, and the second processing means performs region recognition as the predetermined processing in the second image processing.

(Supplementary Note 5)

The image processing device according to supplementary note 4, further including a synthesis means configured to synthesize the processing result of the first image processing and the processing result of the second image processing, in which the synthesis means determines a subject type in each region of the distant portion of the image based on a subject type estimated in the first image processing, a subject type estimated in the second image processing, and a predetermined priority for each subject type.

(Supplementary Note 6)

The image processing device according to supplementary note 1 or 2, in which as the second image processing, the second processing means performs image processing on the distant portion of the image a setting different from that for the first image processing applied.

(Supplementary Note 7)

The image processing device according to any one of supplementary notes 1 to 6, in which the image is an image including a road, and the distant portion specifying means estimates a vanishing point of the road in the image and specifies a predetermined portion where the vanishing point of the road is positioned at the center thereof as the distant portion of the image.

(Supplementary Note 8)

The image processing device according to supplementary note 7, in which the distant portion specifying means estimates the vanishing point of the road in the image based on a region determined to be the road in a region recognition processing result with respect to the image.

(Supplementary Note 9)

The image processing device according to any one of supplementary notes 1 to 6, further including a depth data acquisition means configured to acquire depth data, in which the distant portion specifying means specifies the distant portion in the image based on the depth data.

(Supplementary Note 10)

The image processing device according to any one of supplementary notes 1 to 9, further including a scene recognition means configured to recognize a situation of a road based on the processing result of the first image processing and the processing result of the second image processing.

(Supplementary Note 11)

The image processing device according to any one of supplementary notes 1 to 10, in which the output means provides predetermined output to a vehicle traveling on a road based on the processing result of the first image processing and the processing result of the second image processing.

(Supplementary Note 12)

An image processing method performed by an image processing device, the image processing method including:

acquiring an image captured by an imaging device;

performing first image processing on the image;

specifying a distant portion of the image;

performing second image processing on the distant portion of the image, the second image processing being different from the first image processing; and providing output based on a processing result of the first image processing and a processing result of the second image processing.

(Supplementary Note 13)

A recording medium storing a program causing a computer to execute:

acquiring an image captured by an imaging device;

performing first image processing on the image;

specifying a distant portion of the image;

performing second image processing on the distant portion of the image, the second image processing being different from the first image processing; and providing output based on a processing result of the first image processing and a processing result of the second image processing.

31

REFERENCE SIGNS LIST

10 Image processing device
20 Imaging device
110 Image acquisition unit
120 Image processing unit
121 First processing unit
122 Distant portion specifying unit
123 Second processing unit
124 Synthesis unit
130 Scene recognition unit
140 Output unit
150 Depth data acquisition unit
1000 Computer
1001 Processor
1002 ROM
1003 RAM
1004 Program
1005 Storage device
1006 Recording medium
1007 Drive device
1008 Communication interface
1009 Input device
1010 Output device
1011 Input/output interface
1012 Bus

What is claimed is:

1. An image processing device comprising:
at least one memory storing instructions; and
at least one processor configured to access the at least one memory and execute the instructions to:
acquire an image captured by an imaging device;
perform region recognition of the image as first image processing;
specify a distant portion of the image;
perform second image processing on the distant portion of the image, wherein the second image processing is different from the first image processing and the second image processing includes enlarging the distant portion of the image, performing region recognition of the image as predetermined processing on the enlarged image, and reducing an area of a processing result of the predetermined processing;
synthesize the processing result of the first image processing and the processing result of the second image processing, by determining a subject type in each region of the distant portion of the image based on a subject type estimated in the first image processing, a subject type estimated in the second image processing, and a predetermined priority for each subject type; and
provide output based on a processing result of the first image processing and a processing result of the second image processing.

2. The image processing device according to claim 1, wherein
the at least one processor is further configured to execute the instructions to:
synthesize the processing result of the first image processing and the processing result of the second image processing.

3. The image processing device according to claim 1, wherein
the at least one processor is further configured to execute the instructions to:

as the second image processing, perform image processing on the distant portion of the image with a setting different from that for the first image processing applied.

4. The image processing device according to claim 1, wherein the image is an image including a road, and
the at least one processor is further configured to execute the instructions to:
estimate a vanishing point of the road in the image; and
specify a portion based on the vanishing point of the road as the distant portion of the image.

5. The image processing device according to claim 4, wherein
the at least one processor is further configured to execute the instructions to:
estimate the vanishing point of the road in the image based on a region determined to be the road in a region recognition processing result with respect to the image.

6. The image processing device according to claim 1, wherein
the at least one processor is further configured to execute the instructions to:
acquire depth data; and
specify the distant portion in the image based on the depth data.

7. The image processing device according to claim 1, wherein
the at least one processor is further configured to execute the instructions to:
recognize a situation of a road based on the processing result of the first image processing and the processing result of the second image processing.

8. The image processing device according to claim 1, wherein
the at least one processor is further configured to execute the instructions to:
providing output to a vehicle traveling on a road based on the processing result of the first image processing and the processing result of the second image processing.

9. An image processing method performed by an image processing device, the image processing method comprising:
acquiring an image captured by an imaging device;
performing region recognition of the image as first image processing;
specifying a distant portion of the image;
performing second image processing on the distant portion of the image, wherein the second image processing is different from the first image processing and the second image processing includes enlarging the distant portion of the image, performing region recognition of the image as predetermined processing on the enlarged image, and reducing an area of a processing result of the predetermined processing;
synthesizing the processing result of the first image processing and the processing result of the second image processing, by determining a subject type in each region of the distant portion of the image based on a subject type estimated in the first image processing, a subject type estimated in the second image processing, and a predetermined priority for each subject type; and
providing output based on a processing result of the first image processing and a processing result of the second image processing.

10. A non-transitory computer readable recording medium storing a program causing a computer to execute:

acquiring an image captured by an imaging device;

performing region recognition of the image as first image processing;

specifying a distant portion of the image;

performing second image processing on the distant portion of the image, wherein the second image processing is different from the first image processing and the second image processing includes enlarging the distant portion of the image, performing region recognition of the image as predetermined processing on the enlarged image, and reducing an area of a processing result of the predetermined processing;

synthesizing the processing result of the first image processing and the processing result of the second image processing, by determining a subject type in each region of the distant portion of the image based on a subject type estimated in the first image processing, a subject type estimated in the second image processing, and a predetermined priority for each subject type; and providing output based on a processing result of the first image processing and a processing result of the second image processing.

<div align="center">* * * * *</div>